United States Patent
Kaminsky et al.

(10) Patent No.: US 9,683,175 B2
(45) Date of Patent: Jun. 20, 2017

(54) SYSTEMS AND METHODS FOR SEPARATING COMPONENTS OF A SLURRY

(75) Inventors: Robert D. Kaminsky, Houston, TX (US); Matthew A Dawson, Sugar Land, TX (US)

(73) Assignee: ExxonMobil Upstream Research Company, Spring, TX (US)

( * ) Notice: Subject to any disclaimer, the term of this patent is extended or adjusted under 35 U.S.C. 154(b) by 546 days.

(21) Appl. No.: 14/115,053

(22) PCT Filed: May 4, 2012

(86) PCT No.: PCT/US2012/036553
§ 371 (c)(1),
(2), (4) Date: Oct. 31, 2013

(87) PCT Pub. No.: WO2012/177327
PCT Pub. Date: Dec. 27, 2012

(65) Prior Publication Data
US 2014/0138286 A1    May 22, 2014

Related U.S. Application Data

(60) Provisional application No. 61/500,459, filed on Jun. 23, 2011.

(51) Int. Cl.
*C10G 1/04* (2006.01)
*F26B 5/00* (2006.01)
*B01D 12/00* (2006.01)

(52) U.S. Cl.
CPC ............ *C10G 1/045* (2013.01); *B01D 12/00* (2013.01); *F26B 5/005* (2013.01)

(58) Field of Classification Search
CPC .......... C10G 1/045; B01D 12/00; F26B 5/005
See application file for complete search history.

(56) References Cited

U.S. PATENT DOCUMENTS

| | | |
|---|---|---|
| 2,537,605 A | 8/1947 | Sewell |
| 3,131,141 A | 4/1964 | West |
| (Continued) | | |

FOREIGN PATENT DOCUMENTS

| | | |
|---|---|---|
| EP | 079040 | 11/1982 |
| GB | 2418629 | 2/2005 |
| (Continued) | | |

OTHER PUBLICATIONS

D. Yan et al., (2003), "Dewatering of Fine Slurries by the Kalgoorlie Filter Pipe", Minerals Engineering, 16, pp. 283-289.

(Continued)

*Primary Examiner* — Randy Boyer
*Assistant Examiner* — Juan Valencia
(74) *Attorney, Agent, or Firm* — ExxonMobil Upstream Research Company Law Dept.

(57) ABSTRACT

Systems and methods for removing fluid from a slurry fluid and a plurality of solid particles including flowing a slurry stream that includes the slurry through a slurry conduit, injecting a displacing fluid through a first perforated region that is in fluid communication with the slurry conduit, displacing at least a portion of the slurry fluid from the slurry, and producing a displaced fluid stream, which may include the displaced portion of the slurry fluid and/or a portion of the injected displacing fluid, from a second perforated region that is in fluid communication with the slurry conduit. The systems and methods also may include producing a product slurry stream from the slurry conduit, separating the components of the displaced fluid stream, separating the components of the product slurry stream, and/or recycling a portion of one or more of the streams.

6 Claims, 10 Drawing Sheets

(56) References Cited

U.S. PATENT DOCUMENTS

| | | | |
|---|---|---|---|
| 3,523,077 | A | 8/1970 | Camirand et al. |
| 3,818,846 | A | 6/1974 | Reese |
| 4,389,300 | A | 6/1983 | Mitchell |
| 4,406,499 | A | 9/1983 | Yildirim |
| 4,596,651 | A | 6/1986 | Wolff et al. |
| 4,699,709 | A | 10/1987 | Peck |
| 4,704,200 | A | 11/1987 | Keane |
| 4,770,793 | A | 9/1988 | Treffry-Goatley et al. |
| 5,534,136 | A | 7/1996 | Rosenbloom |
| 7,363,973 | B2 | 4/2008 | Nenniger et al. |
| 7,540,951 | B2 | 6/2009 | Selmen et al. |
| 7,608,170 | B1 | 10/2009 | Ousey |
| 2003/0150804 | A1* | 8/2003 | Haubs .............. B01D 12/00 210/634 |
| 2006/0077274 | A1 | 4/2006 | Wako et al. |
| 2010/0068109 | A1 | 3/2010 | Comrie |
| 2010/0154304 | A1 | 6/2010 | Tsangaris et al. |
| 2010/0276148 | A1 | 11/2010 | Wylie et al. |
| 2010/0307959 | A1 | 12/2010 | Hong et al. |

FOREIGN PATENT DOCUMENTS

| | | |
|---|---|---|
| WO | WO 2009/111333 | 2/2009 |
| WO | WO 2011/025590 | 7/2010 |

OTHER PUBLICATIONS

Miska et al., (2004), Advanced Cuttings Transport Study, http://www.osti.gov/energycitations/serviets/puri/835222-tgy3m3/native/835222.pdf.

\* cited by examiner

SYSTEMS AND METHODS FOR SEPARATING COMPONENTS OF A SLURRY

CROSS-REFERENCE TO RELATED APPLICATION

This application is the National Stage of International Application No. PCT/US2012/036553, filed May 4, 2012, which claims the priority benefit of U.S. Provisional Patent Application 61/500,459 filed 23 Jun. 2011 entitled SYSTEMS AND METHODS FOR SEPARATING COMPONENTS OF A SLURRY, the entirety of which is incorporated by reference herein.

FIELD OF THE DISCLOSURE

The present disclosure is directed to systems and methods for removing fluid from a slurry, and more particularly to systems and methods that include injecting a displacing fluid into the slurry to displace a liquid contained therein.

BACKGROUND OF THE DISCLOSURE

A slurry may refer to any suitable heterogeneous mixture of solid particles in a liquid. Illustrative, non-exclusive examples of slurries include dispersions, suspensions, and/or colloids. Slurries may include heterogeneous mixtures, in which the solid particles may be physically distributed within the liquid, but in which at least a portion of the solid particles may separate from the liquid naturally over time due to various spontaneous, or naturally occurring, separation mechanisms. Illustrative, non-exclusive examples of such separation mechanisms include settling, agglomeration, aggregation, precipitation, coalescence, sedimentation, creaming, and/or other separation processes that may be governed by gravitational, electrostatic, interfacial, and/or other naturally occurring forces.

However, for certain slurries, these spontaneous separation processes may be extremely slow and/or may proceed for a period of time, after which a separation rate may decrease significantly and/or separation may effectively cease. Additionally, slurries also may include heterogeneous mixtures, in which at least a portion of the solid particles may remain suspended within the liquid indefinitely due to electrostatic repulsion among the solid particles that may resist the above separation mechanisms. In addition, capillary forces between the liquid and the solid particles may further slow the separation process.

In a number of industrial processes, illustrative, non-exclusive examples of which include oil production, separation of hydrocarbons from oil sands, and/or dewatering of mine tailings, it may be desirable to separate at least a portion of the liquid component of the slurry from the solid particles. For certain slurry compositions, separation of the solid and liquid components of the slurry may be accomplished by making use of the above-described naturally occurring separation mechanisms. However, a separation rate obtained using these naturally occurring separation mechanisms may be significantly slower than a separation rate that may be desired and/or needed for efficient and/or economical operation of the separation process. In addition, natural separation of the solid and liquid components simply may not occur for other slurry compositions.

While a number of processes for separating the components of a mixture exist, these processes may not be effective and/or economical for separating slurry components. This may be due to a variety of factors, illustrative, non-exclusive examples of which may include the abrasive nature of some solid particles and the expense associated with designing and/or constructing valves and/or seals that may resist damage and/or wear due to slurry flow therethrough, the high viscosity of some slurries, and/or plugging of filtration apparatus by the solid particles.

As an illustrative, non-exclusive example, pressure-driven membrane filtration processes may be utilized to separate components of a mixture of solid particles and a liquid, or a solid-liquid mixture. These processes may include pressurizing a fluid that includes particulate material and contacting the fluid-particulate mixture with a first side of a porous surface that has a reduced pressure on a second side. Driven by the pressure differential across the porous surface, the liquid will flow therethrough. However, the solid components that are too large to pass through the porous surface will remain on the first side of the porous surface.

While such pressure-driven membrane filtration processes may be effective at separating the components of the solid-liquid mixture, they also have several limitations. As an illustrative, non-exclusive example, the porous surface may become plugged and/or the pores of the porous surface may become occluded due to the accumulation of solid particles on the first side of the porous surface, resulting in the formation of a filter cake. While this plugging may be reduced and/or eliminated through replacement of the porous surface with a new porous surface and/or by backflow through the filtration equipment, both of these processes may require that the filtration system be taken offline for a period, resulting in lost time and/or a quasi-batch separation process.

In addition to backflowing, the buildup of a filter cake may be reduced by flowing the solid-liquid mixture in a direction that is generally parallel to the porous surface. This parallel flow may result in shear forces that may erode the filter cake and/or substantially reduce formation. However, even when the formation of the filter cake is significantly reduced, the capillary forces between the liquid and the solid particles may prevent the separation process from proceeding at the desired separation rate.

SUMMARY OF THE DISCLOSURE

Systems and methods are disclosed for removing fluid from a slurry that includes a slurry fluid and a plurality of solid particles. These systems and methods may include flowing a slurry stream that includes the slurry through a slurry conduit, and injecting a displacing fluid through a first perforated region that is in fluid communication with the slurry conduit. The systems and methods may further include displacing at least a portion of the slurry fluid from the slurry through a second perforated region that is in fluid communication with the slurry conduit, to produce a displaced fluid stream, which may include the displaced portion of the slurry fluid and/or a portion of the injected displacing fluid.

In some embodiments, the slurry conduit may be defined by a body. In some embodiments, a single surface of the body may define the slurry conduit. In some embodiments, multiple surfaces of the body may define the slurry conduit. In some embodiments, the slurry conduit may be at least one of circular, annular, and rectilinear. In some embodiments the slurry conduit may include an annular space formed by a pipe-in-pipe arrangement. In some embodiments, the systems and methods may include the use of an outer housing to contain at least a portion of the streams and/or components that define the slurry conduit. In some embodiments, the outer housing may surround the slurry conduit in a pipe-in-pipe-in-pipe arrangement.

The first perforated region and/or the second perforated region, which also may be referred to herein as the perforated regions, may include any suitable structure configured to provide fluid communication between a region internal to the slurry conduit and a region external to the slurry conduit. In some embodiments, the perforated regions may include a porous material. In some embodiments, the perforated regions may include one or more perforations which optionally may be in fluid communication with one or more ports.

The systems and methods also may include producing a product slurry stream from the slurry conduit, separating the components of the displaced fluid stream, separating the components of the product slurry stream, and/or recycling a portion of one or more of the streams. In some embodiments, the systems and methods disclosed herein may be utilized as part of a mine tailings dewatering system. In some embodiments, the systems and methods disclosed herein may be utilized as part of a solvent extraction process. In some embodiments, the systems and methods disclosed herein may be utilized to recover hydrocarbons from oil sands.

DETAILED DESCRIPTION AND BEST MODE OF THE DISCLOSURE

Figure 1:
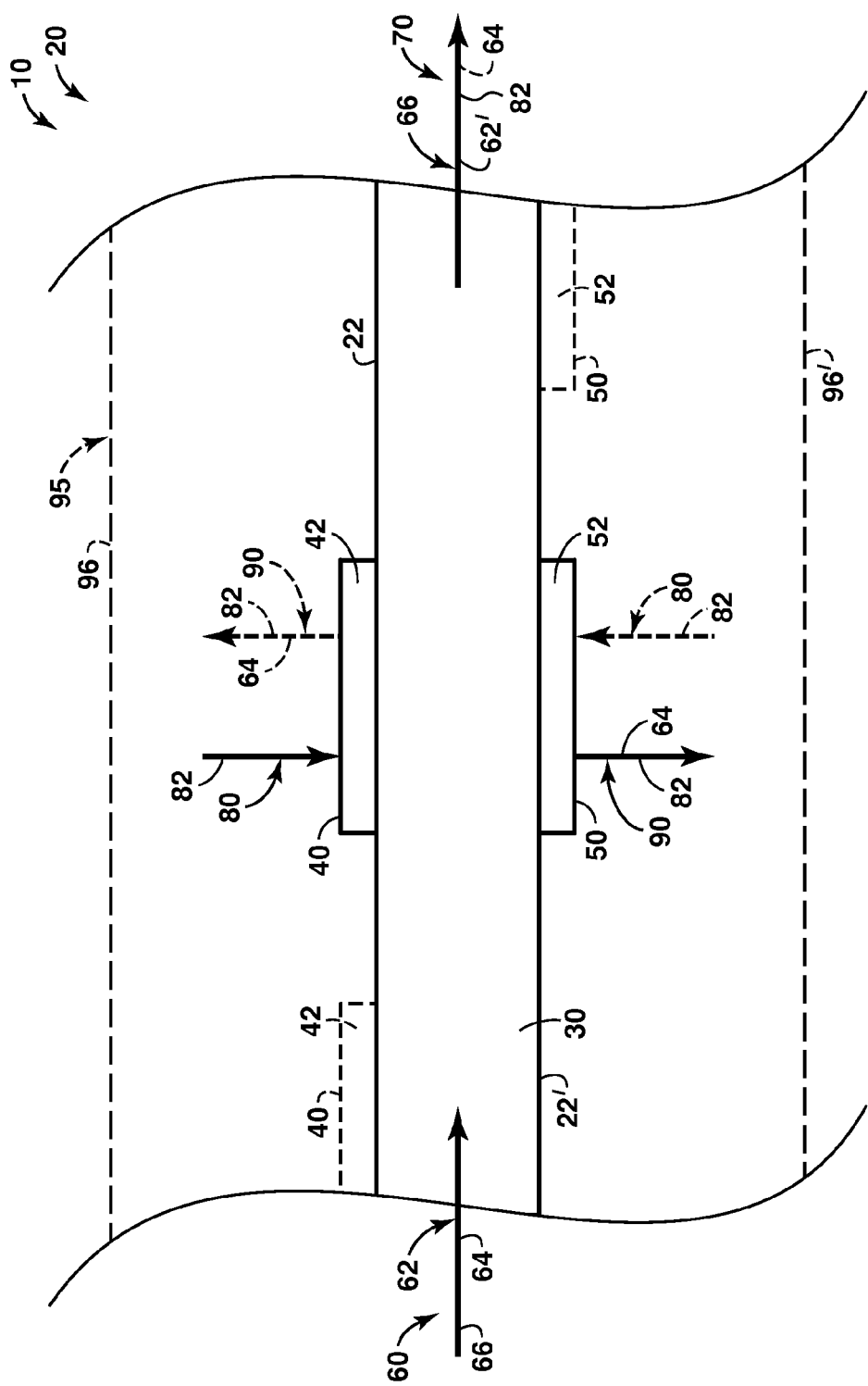
FIG. 1 is a schematic representation of an illustrative, non-exclusive example of systems according to the present disclosure for separating the components of a slurry.

FIG. 1 provides a schematic cross-sectional view of illustrative, non-exclusive examples of a slurry separation assembly 10, which also may be referred to as an apparatus for removing a liquid from a slurry, according to the present disclosure. Slurry separation assembly 10 includes a body 20 that may include one or more elements 22, 22', and/or regions 22, 22', that may define at least a portion of a slurry conduit 30. Slurry conduit 30 is in fluid communication with a first perforated region 40 and a second perforated region 50. A slurry stream 60, including a slurry 62 comprising a slurry liquid 64 and a plurality of solid particles 66, is supplied to slurry conduit 30; and a product slurry stream 70. A displacing fluid stream 80, including displacing fluid 82, may be supplied to at least one of first perforated region 40 and second perforated region 50, and a displaced fluid stream 90, including displacing fluid 82 and a portion of slurry liquid 64, may be produced from the other of first perforated region 40 and second perforated region 50. An outer housing 95 may contain, surround, house, or otherwise confine at least a portion of the plurality of components that define slurry separation assembly 10 and/or the plurality of streams that are associated with slurry separation assembly 10.

Slurry separation assembly 10 may be configured to inject displacing fluid 82 into slurry 62 to displace, substitute, replace, and/or otherwise remove at least a portion of slurry liquid 64 from the slurry. The displaced, substituted, replaced, and/or removed portion of slurry liquid 64 may exit the slurry separation assembly in displaced fluid stream 90 and, as discussed in more detail herein, thereafter optionally may receive subsequent processing, purification, separation, and/or refining. Slurry separation assembly 10 may utilize a pressure-driven displacement and/or separation mechanism to flow, or force, displacing fluid 82 into at least a portion of an interstitial, or void, space present between adjacent solid particles of slurry 62, which may increase a separation rate for the separation of slurry liquid 64 from solid particles 66. The pressure within the separation assembly also may control a physical state, or phase, of the fluids contained therein, such as slurry liquid 64 and/or displacing fluid 82.

It is within the scope of the present disclosure that slurry separation assembly 10 may be utilized for a variety of purposes. As an illustrative, non-exclusive example, slurry liquid 64 may contain or include one or more materials that are to be recovered from slurry 62, and slurry separation assembly 10 may increase the rate of recovery and/or decrease the costs associated with recovery of the materials. Similarly, solid particles 66 may contain or include one or more materials that are to be recovered from slurry 62, and slurry separation assembly 10 may increase the rate of recovery and/or decrease the costs associated with recovery of the materials. As another illustrative, non-exclusive example, it may be necessary to decrease a proportion of slurry 62 that includes slurry liquid 64 prior to disposal, storage, and/or subsequent processing of the slurry and/or solid particles 66 contained therein, and the slurry separation assembly may decrease the time and/or costs associated with this processing.

As discussed in more detail herein, it is within the scope of the present disclosure that displacing fluid 82 may be selected such that it is readily separable from slurry liquid 64 and/or solid particles 66. Thus, separation of displacing fluid 82 from displaced fluid stream 90 to produce a purified, pure, or substantially pure slurry liquid 64 that does not include, or includes a smaller proportion of, solid particles 66 may be simpler, faster, and/or more economical than direct separation of slurry liquid 64 from slurry 62. Similarly, separation of displacing fluid 82 from solid particles 66 to produce dry, or substantially dry, solid particles that do not include, or include a lesser proportion of, slurry liquid 64 may be simpler, faster, and/or more economical than direct separation of slurry liquid 64 from slurry 62. As an illustrative, non-exclusive example, it is within the scope of the present disclosure that displacing fluid 82 may include a gaseous displacing fluid, a displacing fluid with a boiling point that is significantly different from a boiling point of slurry liquid 64, a displacing fluid with a low boiling point, a displacing fluid with a lower affinity for solid particles 66 than slurry liquid 64, and/or a supercritical displacing fluid. These illustrative displacing fluids may facilitate simpler, faster, and/or more economical separation of the components of product slurry stream 70 and/or displaced fluid stream 90.

As discussed in more detail herein, slurry 62 may include any suitable heterogeneous mixture of slurry liquid 64 and solid particles 66, illustrative, non-exclusive examples of which include dispersions, suspensions, and/or colloids. It is within the scope of the present disclosure that slurry 62 may include any suitable proportion, percentage, or ratio of slurry liquid to solid particles. As an illustrative, non-exclusive example, slurry 62 may include 1 to 99 wt % solid particles, optionally including 1-10 wt %, 10-20 wt %, 20-40 wt %, 40-60 wt %, 60-80 wt %, 80-90 wt %, 90-99 wt %, 25-50 wt %, 50-75 wt %, 25-75 wt %, 70-90 wt %, and/or any suitable combination of the above proportions.

It is within the scope of the present disclosure that slurry liquid 64, which also may be referred to as liquid 64 or slurry fluid 64, may include any suitable liquid, illustrative, non-exclusive examples of which include water, brine, hydrocarbons, oil, bitumen, bitumen dissolved in a hydrocarbon solvent, tar, alcohols, solvents, hydrocarbon solvents, and/or solutions. When slurry liquid 64 includes a hydrocarbon solvent, it is within the scope of the present disclosure that the hydrocarbon solvent may include (but is not required in all embodiments to include) a molecular weight of less than 200 grams/mole, illustrative, non-exclusive examples of which include molecular weights of less than 190 grams/mole, less than 180 grams/mole, less than 171 grams/mole, less than 170 grams/mole, less than 160 grams/mole, or less than 150 grams/mole.

Similarly, solid particles 66 may include any suitable material, illustrative, non-exclusive examples of which include sand, clay particles, mine tailings, and/or soil. It is within the scope of the present disclosure that each of the solid particles may include a characteristic dimension, illustrative, non-exclusive examples of which include any suitable diameter, radius, effective diameter, effective radius, and/or maximum extent or dimension. It is further within the scope of the present disclosure that at least 30 wt % of the solid particles with a characteristic dimension of less than 44 microns also have a characteristic dimension of less than 10 microns, and optionally that at least 40 wt %, at least 50 wt %, at least 60 wt %, or at least 70 wt % of the solid particles with a characteristic dimension of less than 44 microns also have a characteristic dimension of less than 10 microns.

Slurry stream 60 may be supplied to slurry separation assembly 10 and/or slurry conduit 30 at any desired volumetric and/or mass flow rate. As an illustrative, non-exclusive example, it is within the scope of the present disclosure that slurry stream 60 may be supplied to the slurry separation assembly at a flow rate that is sufficiently low to produce a laminar flow profile for the slurry stream within the slurry conduit, which may decrease a potential for viscous fingering of the displacing fluid as it flows between the first perforated region and the second perforated region. However, it is also within the scope of the present disclosure that slurry stream 60 may be supplied to the slurry separation assembly at a flow rate that is sufficiently high to produce a turbulent flow profile for the slurry stream within the slurry conduit. Such a turbulent flow profile may increase mixing between the displacing fluid stream and the slurry stream and/or decrease a buildup of a filter cake on the perforated region(s).

Body 20, including elements or regions 22, 22', may include any suitable structure configured to define at least a portion of slurry conduit 30 and may include a single, monolithic structure, a composite structure, and/or a plurality of independent structures. As an illustrative, non-exclusive example, elements or regions 22 and 22' may be portions of a single, monolithic body 20, illustrative, non-exclusive examples of which include any suitable tube, pipe, or other flow conduit. As another illustrative, non-exclusive example, elements or regions 22 and 22' may comprise separate portions, surfaces, and/or components of a composite body 20 and may be operatively attached to one another to form the composite body in any suitable manner. As yet another illustrative, non-exclusive example, elements or regions 20 and 20' may each form a portion of substantially separate, distinct, and/or independent structures, illustrative, non-exclusive examples of which include a pipe-in-pipe arrangement and/or a parallel pipe arrangement.

As discussed in more detail herein, slurry conduit 30 may be defined at least partially by body 20, including elements or regions 22 and 22', which may include a single, monolithic body, a composite body, and/or a plurality of independent structures. It is within the scope of the present disclosure that slurry conduit 30 may include any suitable shape, illustrative, non-exclusive examples of which include elongate shapes that include a substantially uniform transverse cross-sectional shape. Illustrative, non-exclusive examples of transverse cross-sectional shapes for slurry conduit 30 according to the present disclosure include circular, annular, rectilinear, and/or any suitable combination of these shapes, such as circular and/or rectilinear shapes with included circular and/or rectilinear voids.

It is within the scope of the present disclosure that first perforated region 40 and/or second perforated region 50, which optionally may be referred to as first perforated surface 40 and second perforated surface 50, first porous region 40 and second porous region 50, and/or may be referred to more generally as perforated regions and/or perforated surfaces, may include one or more perforations 42, 52, which also may be referred to as one or more fluid flow pathways 42, 52 and/or one or more pores 42, 52. As illustrative, non-exclusive examples, the perforated regions may include any suitable wire mesh, metal screen, sintered metal, porous structure, porous ceramic, cemented rock, perforated metal, hole, filter media, packed bed, surface filter, and/or depth filter.

It is within the scope of the present disclosure that, as discussed in more detail herein, one or more of the perforations associated with the perforated regions may be in fluid communication with and/or form a portion of a flow port. This may include a single perforation that is in fluid communication with a single flow port, a plurality of perforations that are in fluid communication with a single flow port, a single perforation that is in fluid communication with a plurality of flow ports, and/or a plurality of perforations that are in fluid communication with a plurality of flow ports.

Perforated regions 40 and 50 may be present in any suitable location along, within, and/or on body 20, elements or regions 22, 22', and/or slurry conduit 30. As an illustrative, non-exclusive example, and as shown in solid lines in FIG. 1, first perforated region 40 may be generally, or substantially, opposed to, across from, spaced apart in a single direction (such as a direction that is perpendicular to a flow direction of slurry stream 60) from, and/or aligned with second perforated region 50. However, and as shown in dashed lines in FIG. 1, it is also within the scope of the present disclosure that first perforated region 40 may be offset from and/or spaced apart in two or more directions (such as the direction that is perpendicular to the flow direction of slurry stream 60 and a direction that is parallel to the flow direction of slurry stream 60) from second perforated region 50.

It is within the scope of the present disclosure that first perforated region 40 and/or second perforated region 50 may include any suitable scope, size, and/or extent along, within, and/or on body 20 and/or slurry conduit 30. As an illustrative, non-exclusive example, perforated regions 40 and 50 may be present in one or more discrete locations along body 20 and/or slurry conduit 30, as shown in FIG. 1. However, it is also within the scope of the present disclosure that the perforated regions may be continuous, or at least substantially continuous, along, within, and/or on body 20 and/or slurry conduit 30. It is further within the scope of the present disclosure that first perforated region 40 and/or second perforated region 50 may include a plurality of spaced-apart perforated regions.

It is within the scope of the present disclosure that first perforated region 40 and/or second perforated region 50 may form a portion of body 20 (such as when first perforated region 40 and/or second perforated region 50 and body 20 form a monolithic structure). However, it is also within the scope of the present disclosure that first perforated region 40 and/or second perforated region 50 may include a separate structure that is associated with, in fluid communication with, and/or operatively attached to body 20. This may include perforated regions that may be configured to be permanently, or substantially permanently attached to body 20, as well as perforated regions that may be configured to be selectively removed, or otherwise separated from, body 20, such as for repair, replacement, and/or cleaning.

Perforations 42, 52 may include any suitable pore, hole, and/or porous structure, may be of any suitable size and/or extent, and may form a periodic, or systematic, structure and/or may be located randomly within perforated regions 40, 50. Perforations may include a characteristic dimension, such as a characteristic diameter, a characteristic radius, and/or characteristic pore size. It is within the scope of the present disclosure that this characteristic dimension may be configured, selected, chosen, and/or otherwise defined based, at least in part, on the characteristic dimension of the solid particles in (or expected to be in) slurry 66. As an illustrative, non-exclusive example, this characteristic dimension may be selected to prevent at least 90 wt % of the solid particles from passing through perforations 42, 52, optionally including a characteristic dimension that may be selected to prevent at least 92 wt %, at least 94 wt %, at least 96 wt %, at least 98 wt %, at least 99 wt %, at least 99.5 wt %, or at least 99.9 wt % of the solid particles from passing through perforations 42, 52.

Additionally or alternatively, it is also within the scope of the present disclosure that the characteristic dimension of the perforations may be selected to permit a certain size, size range, and/or proportion of the solid particles to pass therethrough. As an illustrative, non-exclusive example, the characteristic dimension of the perforations may be selected to permit at least 30 wt % of the solid particles that are less than 1 micron in diameter to pass therethrough, including permitting at least 40 wt %, at least 50 wt %, at least 60 wt %, or at least 70 wt % of the solid particles that are less than 1 micron in diameter to pass therethrough.

Displacing fluid stream 80 may include any suitable displacing fluid 82 that may be injected into the slurry stream and may expel, eject, force out, or otherwise displace slurry liquid 64 from slurry stream 60 and/or slurry 62. Illustrative, non-exclusive examples of displacing fluids 82 according to the present disclosure include a gas phase fluid, a vapor phase fluid, a liquid phase fluid, a supercritical fluid, and/or a dense supercritical fluid, illustrative, non-exclusive examples of which include water, brine, hydrocarbons, solvents, alcohols, air, nitrogen, steam, methane, natural gas, propane, butane, dimethylether, and/or carbon dioxide.

When displacing fluid 82 includes hydrocarbons, it is within the scope of the present disclosure that the displacing fluid may include at least 30 wt %, at least 40 wt %, at least 50 wt %, at least 60 wt %, or at least 70 wt % hydrocarbons and that the hydrocarbons may include an average molecular weight of 200 grams/mole or less, 175 grams/mole or less, 150 grams/mole or less, 125 grams/mole or less, 100 grams/mole or less, 90 grams/mole or less, 80 grams/mole or less, 70 grams/mole or less, 60 grams/mole or less, 50 grams/mole or less, 40 grams/mole or less, or 30 grams/mole or less, although hydrocarbon proportions of less than 30 wt %, as well as hydrocarbon molecular weights of greater than 200 grams/mole are also within the scope of the present disclosure.

When displacing fluid 82 includes carbon dioxide, it is within the scope of the present disclosure that the carbon dioxide may be present in a gaseous and/or in a supercritical state. In addition, the carbon dioxide may comprise at least 25 wt %, at least 30 wt %, at least 35 wt %, at least 40 wt %, at least 45 wt %, at least 50 wt %, at least 55 wt %, at least 60 wt %, at least 65 wt %, at least 70 wt %, or at least 75 wt % of the displacing fluid, although proportions of less than 25 wt % carbon dioxide are also within the scope of the present disclosure.

Displaced fluid stream 90 may include any suitable fluids that may be expelled, ejected, forced out, removed, or otherwise displaced from slurry 62 through the displacing action of displacing fluid stream 80 and/or due to other factors. Illustrative, non-exclusive examples of other factors according to the present disclosure include pressure-driven separation of the components of slurry 62, diffusion-driven separation of the components of slurry 62, and/or gravitational forces. Typically, displaced fluid stream 90 will include displacing fluid 82, and a lower concentration of slurry liquid 64 than was present before the displacing fluid was introduced into the slurry. As discussed herein, the displaced fluid stream may include some of the solid particles 66 of slurry 62, although this typically will be limited to fine particles.

Product slurry stream 70 may include any suitable portion and/or fraction of the components of slurry stream 60 and/or displacing fluid stream 80 that are not removed from slurry separation assembly 10 in displaced fluid stream 90. This may include a portion of solid particles 66 that does not pass through first perforated region 40 and/or second perforated region 50, a portion of slurry liquid 64 that is not displaced from slurry 62 by displacing fluid 82, and/or a portion of displacing fluid 82 that is not removed from slurry 62 in displaced fluid stream 90. The product slurry stream may additionally or alternatively be described as containing a product, or composite, slurry 62' that includes solid particles 66, as well as slurry liquid 64 and displacing fluid 82.

Outer housing 95 may include any suitable structure configured to contain, surround, house, or otherwise confine at least a portion of the plurality of components that define slurry separation assembly 10 and/or at least a portion of the plurality of streams that are associated with slurry separation assembly 10. This may include any suitable tube, pipe, conduit, and/or cover, illustrative, non-exclusive examples of which are discussed in more detail herein. It is within the scope of the present disclosure that outer housing 95 may include a fluid impervious, non-perforated, and/or non-porous outer housing 95. It is also within the scope of the present disclosure that outer housing 95 may include one or more flow ports that may provide fluid communication between a region internal to the outer housing and a region external to the outer housing. Similar to elements 22, 22' of body 20, housing 95 also may include one or more elements, or regions that form the housing, or portions thereof. This is schematically illustrated in FIG. 1 with housing region 96 and 96'.

It is within the scope of the present disclosure that slurry separation assembly 10 may be configured, designed, or otherwise adapted to maintain a target, or desired, pressure differential between two or more of the streams associated with slurry separation assembly 10. As an illustrative, non-exclusive example, displacing fluid stream 80 may be supplied to a perforated region and/or injected into slurry stream 60 and/or slurry conduit 30 at an injection pressure that is higher than a pressure of the slurry stream and/or at a pressure that is higher than a pressure within the slurry conduit. As another illustrative, non-exclusive example, displaced fluid stream 90 may be produced from a perforated region at a displaced fluid pressure that is less than the pressure of the slurry stream and/or that is less than the pressure within the slurry conduit. As yet another illustrative, non-exclusive example, a pressure of slurry stream 60 may be maintained to be greater than a pressure of product slurry stream 70. This may include maintaining a pressure differential between slurry stream 60 and product slurry stream 70 to produce a desired, or target, flow rate of slurry stream 60 through slurry conduit 30 and/or to maintain a desired, or target, pressure, or range of pressures, within the slurry conduit.

It is also within the scope of the present disclosure that, as shown in dashed lines in FIG. 1, the flow of displacing fluid stream 80 and displaced fluid stream 90 may be reversed. Thus, the displacing fluid stream may be supplied to first perforated region 40 or to second perforated region 50, including being supplied to first perforated region 40 for a period of time and subsequently being supplied to second perforated region 50 for a period of time. As discussed in more detail herein, such a forward flow followed by backflow configuration may decrease a potential for clogging, plugging, and/or occlusion of perforations 42, 52 of perforated regions 40, 50 by solid particles 66.

Less schematic but still illustrative, non-exclusive examples of slurry separation assemblies according to the present disclosure are shown in FIGS. 2-10. FIGS. 2-6 illustrate several variations on an embodiment in which elements or regions 22 and 22', including first perforated region 40 and second perforated region 50, respectively, are formed from distinct, or at least substantially distinct, structures, slurry conduit 30 includes an annular, or substantially annular, cross-sectional shape, and outer housing 95 surrounds, or at least substantially surrounds, body 20 in a pipe-in-pipe-in-pipe arrangement, or geometry.

Figure 7:
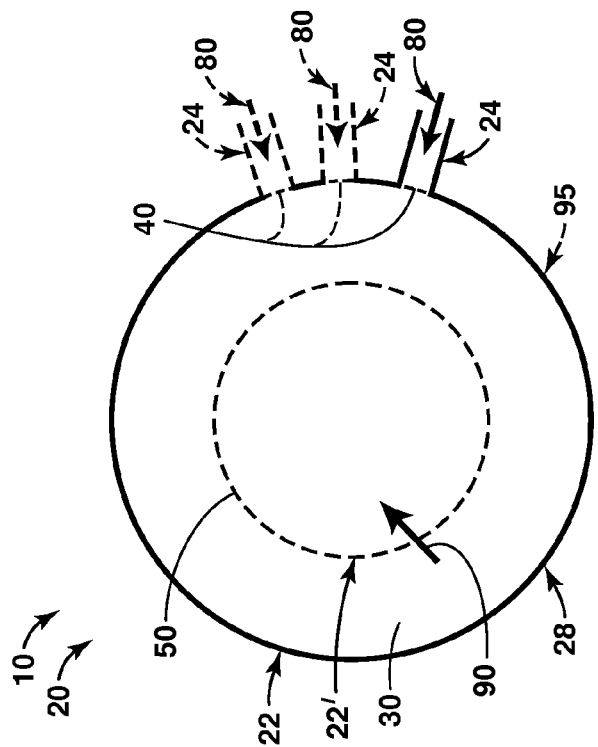
FIG. 7 is a transverse cross-sectional view of another illustrative, non-exclusive example of a system according to the present disclosure for separating the components of the slurry that includes a pipe-in-pipe arrangement and one or more fluid injection and/or fluid production ports.

FIG. 7 illustrates an embodiment in which elements or regions 22 and 22', including first perforated region 40 and second perforated region 50, respectively, are formed from distinct, or at least substantially distinct, structures in a pipe-in-pipe arrangement. In FIG. 7, slurry conduit 30 includes an annular, or substantially annular, cross-sectional shape, and body 20 includes one or more fluid flow ports 24, or flow ports 24, in fluid communication with one or more first perforated region(s) 40.

Figure 8:
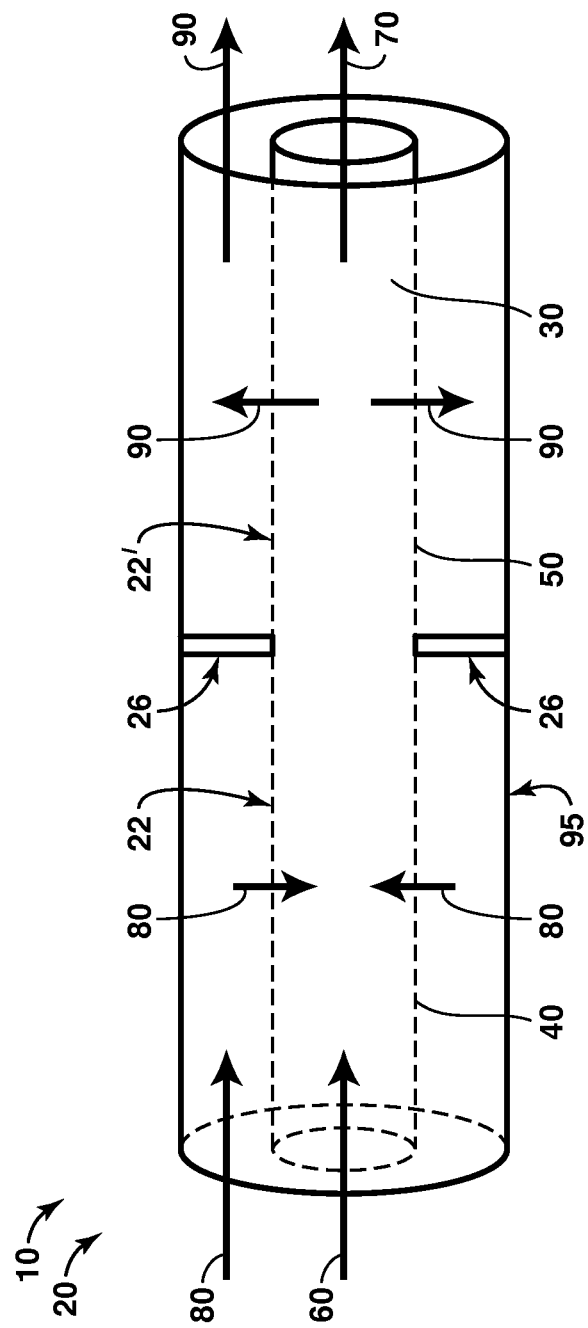
FIG. 8 is a schematic representation of another illustrative, non-exclusive example of a system according to the present disclosure for separating the components of the slurry that includes a pipe-in-pipe arrangement and a barrier.
Figure 9:
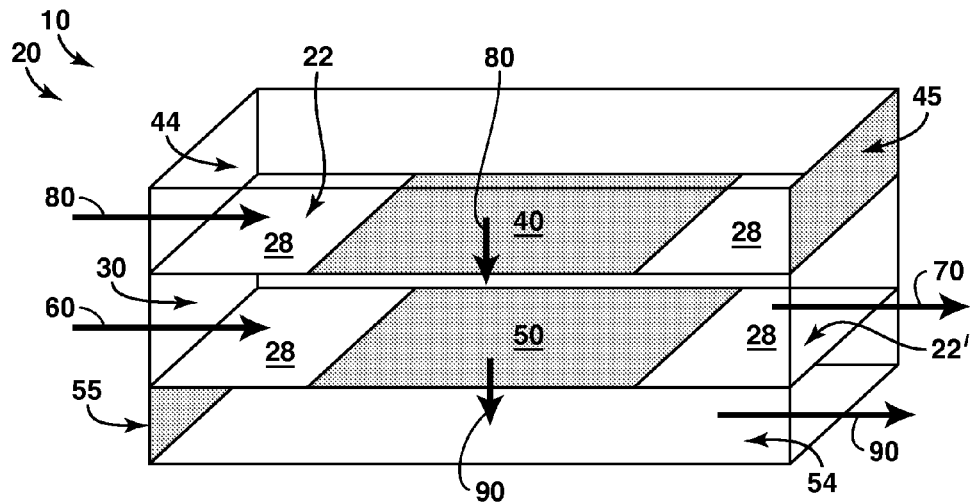
FIG. 9 is a schematic representation of another illustrative, non-exclusive example of a system according to the present disclosure for separating the components of the slurry that includes a planar system geometry and substantially opposed perforated regions.
Figure 10:
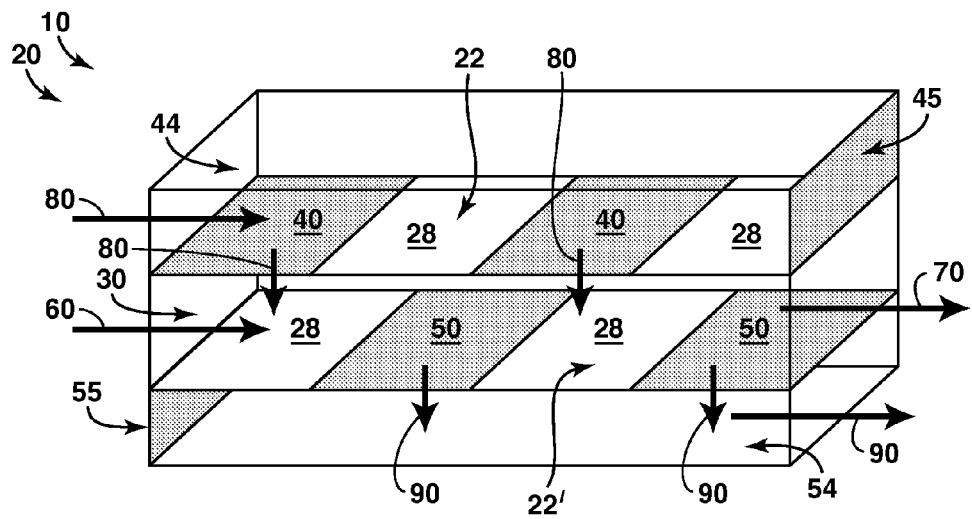
FIG. 10 is a schematic representation of another illustrative, non-exclusive example of a system according to the present disclosure for separating the components of the slurry that includes a planar system geometry and substantially offset perforated regions.

FIG. 8 illustrates an embodiment in which elements or regions 22 and 22', including first perforated region 40 and second perforated region 50, respectively, are formed from different portions of a single, continuous, and/or substantially continuous body, slurry conduit 30 includes a circular, or substantially circular, cross-sectional shape, and a barrier 26 separates, segregates, occludes, and/or otherwise prevents direct fluid communication between displacing fluid stream 80 and displaced fluid stream 90, encouraging flow of displacing fluid stream 80 into and production of displaced fluid stream 90 from slurry conduit 30 in a pipe-in-pipe arrangement. FIGS. 9 and 10 illustrate an embodiment in which elements or regions 22 and 22', including first perforated region 40 and second perforated region 50, respectively, include substantially planar elements or regions 22 and 22', and slurry conduit 30 is defined at least in part by the planar elements or regions.

Figure 2:
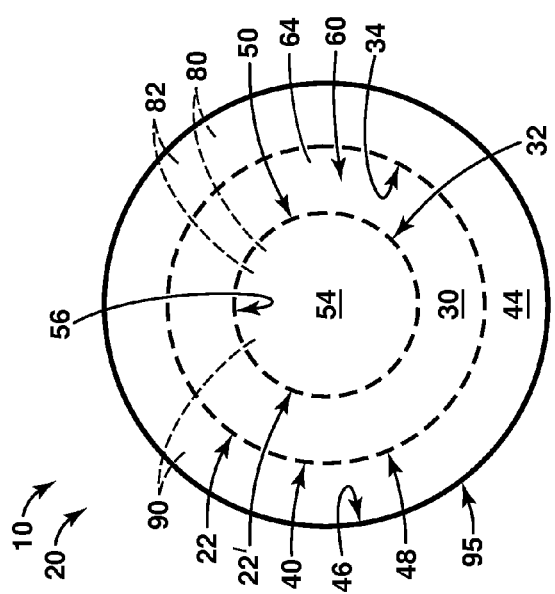
FIG. 2 is a transverse cross-sectional view of a less schematic but still illustrative, non-exclusive example of a system according to the present disclosure for separating the components of the slurry that includes a pipe-in-pipe-in-pipe arrangement.

In FIG. 2, element 22' is contained within and/or surrounded by element 22, which is in turn contained within and/or surrounded by outer housing 95 in a pipe-in-pipe-in-pipe geometry. Thus, element 22' defines both an inner surface 32 of slurry conduit 30, as well as an outer surface 56 of a second conduit 54. Similarly, element 22 defines both an outer surface 34 of slurry conduit 30, as well as an inner surface 48 of a first conduit 44. In addition, outer housing 95 defines an outer surface 46 of first conduit 44.

Elements 22 and 22' include first perforated region 40 and second perforated region 50, respectively. Displacing fluid stream 80 may be delivered to one of first conduit 44 and second conduit 54 and flow through first perforated region 40 or second perforated region 50, respectively, and into slurry conduit 30. Displacing fluid 82 from displacing fluid stream 80 may mix, or otherwise combine, with slurry stream 60 within slurry conduit 30, increasing a pressure of the slurry stream and displacing or substituting itself for at least a portion of slurry liquid 64 contained therein. This increase in pressure and/or displacement of slurry liquid 64 may provide a driving force (in addition to any naturally present driving forces) for the production of displaced fluid stream 90, which may flow from slurry conduit 30, through second perforated region 50 or first perforated region 40 (i.e., the perforated region through which the displacing fluid stream was not passed into the slurry conduit) and into the other of first conduit 44 and second conduit 54.

Figure 3:
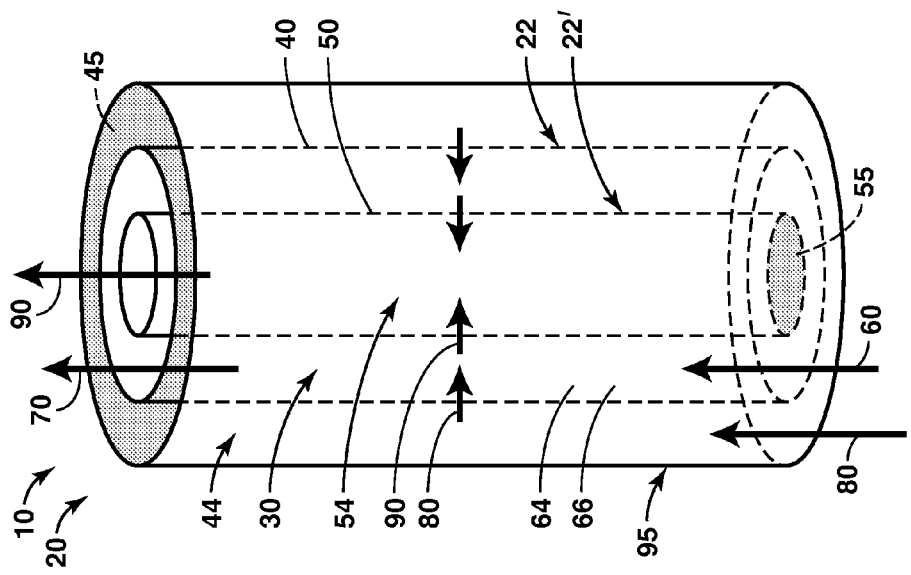
FIG. 3 is a schematic view of the system of FIG. 2 being operated in a forward-flow configuration.
Figure 4:
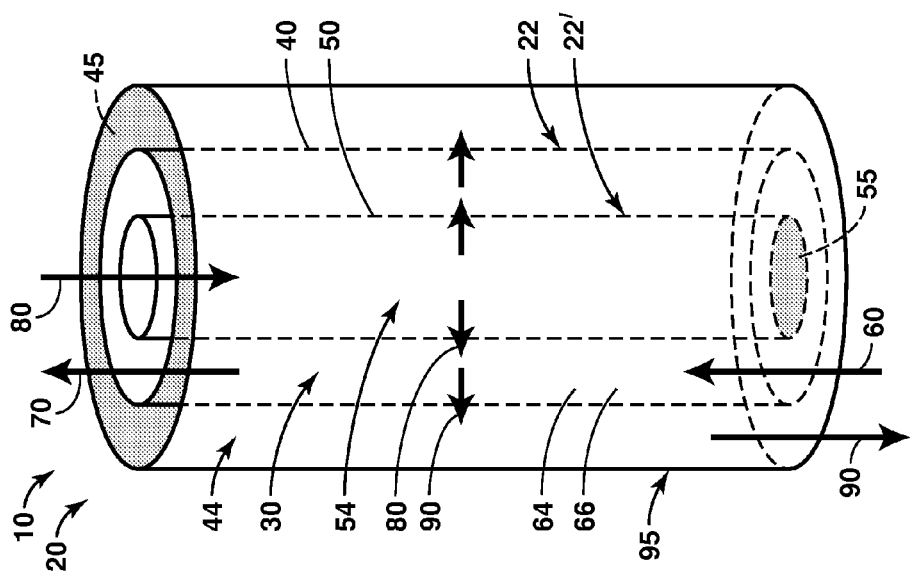
FIG. 4 is a schematic view of the system of FIG. 2 being operated in a backflow configuration.

FIGS. 3 and 4 provide schematic views of a slurry separation assembly similar to that of FIG. 2 being operated in a forward-flow configuration and in a backflow configuration, respectively. In the forward-flow configuration of FIG. 3, displacing fluid stream 80 may be supplied to first conduit 44, flow through first perforated region 40, and enter slurry conduit 30, where it may displace at least a portion of slurry liquid 64 contained within slurry stream 60, which is flowing therethrough. The displaced slurry liquid 64, and optionally a portion of displacing fluid stream 80, may flow through second perforated region 50 and into second conduit 54 as displaced fluid stream 90, which may exit slurry separation assembly 10. Similarly, product slurry stream 70 may exit the slurry separation assembly as shown. First conduit barrier 45 and/or second conduit barrier 55 may control, limit, and/or occlude a flow of displacing fluid stream 80 and/or displaced fluid stream 90 within the slurry separation assembly, providing for flow in a target, or desired, flow pathway through the slurry separation assembly. The forward-flow configuration also may be referred to as flowing at least one of the displacing fluid stream, the slurry liquid, and the displaced fluid stream between the first perforated region and the second perforated region and/or from the first perforated region to the second perforated region.

In the backflow configuration of FIG. 4, the slurry separation assembly is substantially similar to the slurry separation assembly of FIG. 3 except that the flows of displacing fluid stream 80 and displaced fluid stream 90 have been reversed. Thus, displacing fluid stream 80 enters the slurry separation assembly through second conduit 54, flows through second perforated region 50 into slurry conduit 30, and combines with slurry 60 in slurry conduit 30. At least a portion of slurry liquid 64 and/or displacing fluid stream 80 flows through first perforated region 40 and into first conduit 44 as displaced fluid stream 90, which may exit the slurry separation assembly. The backflow configuration also may be referred to as flowing at least one of the displacing fluid stream, the slurry liquid, and the displaced fluid stream between the second perforated region and the first perforated region and/or from the second perforated region to the first perforated region.

FIGS. 3 and 4 schematically illustrate that slurry separation assemblies 10 according to the present disclosure may be configured for continuous, or substantially continuous, operation in both the forward-flow and the backflow configurations. Thus, it is within the scope of the present disclosure that the slurry separation assembly may be operated in the forward-flow configuration for a forward-flow period of time, after which the flows of displacing fluid stream 80 and displaced fluid stream 90 may be reversed and the slurry separation assembly may be operated in the backflow configuration for a backflow period of time. During operation in the forward-flow configuration and/or the backflow configuration, it is within the scope of the present disclosure that flowing of slurry stream 60 through the slurry separation assembly, injecting of displacing fluid stream 80 into the slurry stream, and production of displaced fluid stream 90 from the slurry separation assembly may be continuous and/or performed simultaneously. In addition, and as discussed in more detail herein, a significant, majority, and/or desired proportion of the solid particles contained within slurry stream 60 may be retained within slurry conduit 30 whether the slurry separation assembly is operated in the forward-flow configuration or the backflow configuration.

During operation of slurry separation assembly 10, a portion of solid particles 66 within slurry stream 60 may become trapped, entrained, captured, or otherwise contained within the one or more perforations of perforated region 40 and/or perforated region 50 as contained solid particles. These contained solid particles may occlude at least a portion of the perforation(s), thereby increasing a resistance to fluid flow and/or decreasing a fluid flow rate therethrough. Reversing the flow of displacing fluid stream 80 and displaced fluid stream 90, such as by transitioning between the forward-flow configuration and the backflow configuration, may remove at least a portion of the contained solid particles from their respective perforation(s), thereby increasing, improving, and/or restoring a fluid flow rate therethrough. As an illustrative, non-exclusive example, it is within the scope of the present disclosure that transitioning between the forward-flow and the backflow configurations may remove at least 50 wt %, at least 60 wt %, at least 70 wt %, at least 80 wt %, or at least 90 wt % of the contained solid particles from their respective perforation(s).

It is within the scope of the present disclosure that this transitioning, or reversing, may be performed periodically, such as on a defined, desired, and/or predetermined schedule. However, it is also within the scope of the present disclosure that this transitioning, or reversing, may be performed responsive to the occurrence of an event. Illustrative, non-exclusive examples of events that may indicate, trigger, or otherwise produce this transitioning or reversing include a flow rate of the displacing fluid stream being less than a threshold magnitude, a flow rate of the slurry stream being less than a threshold magnitude, a flow rate of the displaced fluid stream being less than a threshold magnitude, a pressure differential between the displacing fluid stream and the slurry stream being greater than a threshold magnitude, a pressure differential between the slurry stream and the displaced fluid stream being greater than a threshold magnitude, and/or a pressure differential between the displacing fluid stream and the displaced fluid stream being greater than a threshold magnitude.

Figure 5:
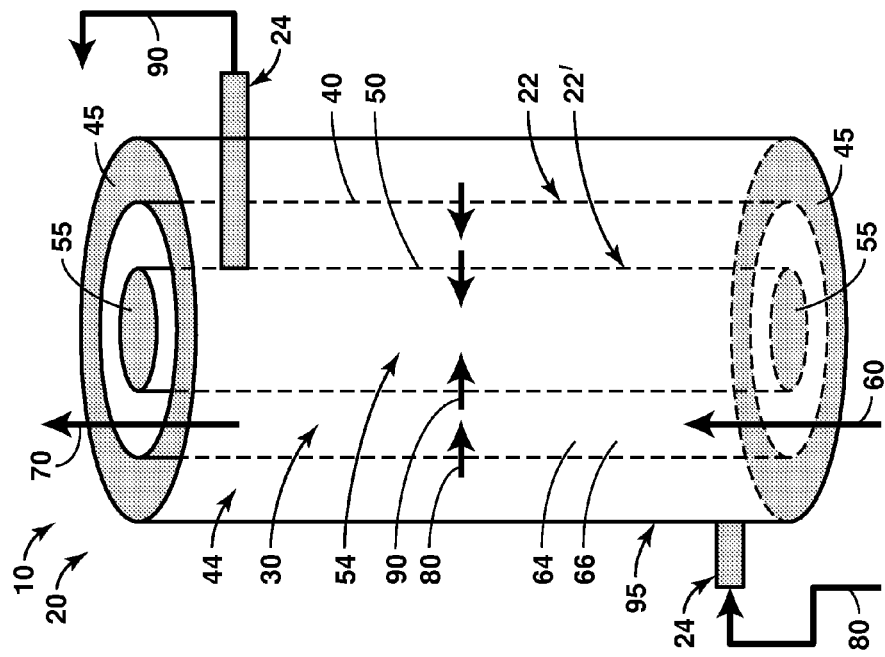
FIG. 5 is a less schematic view of another illustrative, non-exclusive example of a system according to the present disclosure for separating the components of the slurry that includes a pipe-in-pipe-in-pipe arrangement and plurality of fluid injection and/or fluid production ports.

FIG. 5 provides an illustrative, non-exclusive example of an alternative slurry separation assembly 10 according to the present disclosure. The slurry separation assembly of FIG. 5 is substantially similar to the slurry separation assembly of FIGS. 3 and 4 except that both ends of first conduit 44 include first conduit barrier 45 and both ends of second conduit 54 include second conduit barrier 55. In addition, the illustrative, non-exclusive example of FIG. 5 includes two flow ports 24 to supply displacing fluid stream 80 to and/or to remove displaced fluid stream 90 from the slurry separation assembly. Similar to the slurry separation assembly of FIGS. 3 and 4, the slurry separation assembly of FIG. 5 may be operated in both forward-flow and/or backflow configurations. While the slurry separation assembly of FIG. 5 is shown including two first conduit barriers 45, two second conduit barriers 55, and two flow ports 24, it is within the scope of the present disclosure that only one, or no, first conduit barriers or second conduit barriers may be utilized. In addition, it is also within the scope of the present disclosure that the slurry separation assembly of FIG. 5 may include only a single flow port 24.

Figure 6:
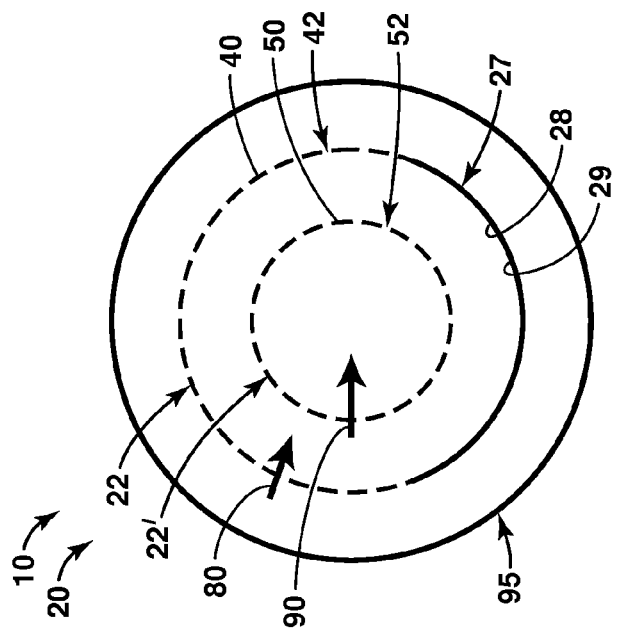
FIG. 6 is a transverse cross-sectional view of a system similar to the system of FIG. 2 but including a specialized region.

It is within the scope of the present disclosure that first perforated region 40 and/or second perforated region 50 may be continuous or discontinuous along a portion of body 20 and/or elements or regions 22 and/or 22'. It is also within the scope of the present disclosure that, as shown in FIG. 6, a portion of body 20 may include one or more specialized regions 27 that may impart additional functionality to and/or improve the performance of slurry separation assembly 10. As an illustrative, non-exclusive example, it is within the scope of the present disclosure that body 20 may include one or more fluid-impervious regions 28 and/or wear-resistant regions 29.

Fluid-impervious region 28 may include any suitable region that may prevent, occlude, and/or stop a flow of fluid therethrough. The use of fluid-impervious region 28 may direct, or otherwise control, a flow of the fluid streams present within slurry separation assembly 10, such as displacing fluid stream 80 and/or displaced fluid stream 90. Illustrative, non-exclusive examples of fluid-impervious regions 28 according to the present disclosure include portions of body 20 that do not include perforations 42 and/or 52, as well as portions of body 20 that are coated, covered, constructed, and/or otherwise isolated such that fluid does not flow therethrough.

Wear-resistant region 29 may be designed, constructed, and/or configured to decrease physical, mechanical, and/or chemical wear associated with the flow of slurry stream 60, product slurry stream 70, displacing fluid stream 80, and/or displaced fluid stream 90 therethrough and/or thereby. This may include wear-resistant regions with a different shape, thickness, surface roughness, and/or chemical composition than other portions of body 20, as well as wear-resistant regions that include a suitable wear-resistant surface treatment or coating. It is within the scope of the present disclosure that wear-resistant region 29 may include fluid-impervious region 28. However, it is also within the scope of the present disclosure that wear-resistant region 29 may include a fluid-permeable region.

Specialized region 27 may be included at any suitable location within slurry separation assembly 10 and/or body 20. As an illustrative, non-exclusive example, the force of gravity acting upon slurry stream 60 may increase wear on a bottom surface of slurry conduit 30 due to the flow of slurry stream 60 thereby and/or the abrasive nature of the solid particles contained within slurry stream 60. Under these conditions, the bottom surface of slurry conduit 30 may include wear-resistant region 29 to increase the durability of the slurry separation assembly.

It is within the scope of the present disclosure that specialized region 27 may form a portion of body 20 (such as when specialized region 27 and body 20 form a monolithic structure). However, it is also within the scope of the present disclosure that specialized region 27 may include a separate structure that is associated with, in fluid communication with, and/or operatively attached to body 20. This may include specialized regions that may be configured to be permanently, or substantially permanently attached to body 20, as well as specialized regions that may be configured to be removed, or otherwise separated from, body 20, such as for repair, replacement, and/or cleaning.

FIG. 7 is yet another illustrative, non-exclusive example of a slurry separation assembly 10 according to the present disclosure. The slurry separation assembly of FIG. 7 does not include outer housing 95. Instead, component 22 of FIG. 7 includes a fluid-impervious region 28 and one or more flow ports 24 that are operatively attached to component 22 such that they are in fluid communication with one or more first perforated regions 40. Additionally or alternatively, outer housing 95 may be considered to form a part of component 22. Thus, flow port(s) 24 may serve to contain, direct, or otherwise restrict fluid flow through first perforated region(s) 40.

In FIG. 7, displacing fluid stream 80 may be supplied to slurry conduit 30 through flow port(s) 24 and first perforated region(s) 40, and produced fluid stream 90 may exit the slurry conduit through second perforated region 50 as shown. Additionally or alternatively, the flow of displacing fluid stream 80 and displaced fluid stream 90 may be reversed. It is within the scope of the present disclosure that any suitable number of flow port(s) 24 may be utilized, that flow port(s) 24 may be in fluid communication with both first perforated region 40 and second perforated region 50, and/or that the flow port(s) may be included within body 20 at any suitable location.

FIG. 8 is yet another illustrative, non-exclusive example of a slurry separation assembly 10 according to the present disclosure. In the slurry separation assembly of FIG. 8, regions 22 and 22', including first perforated region 40 and second perforated region 50, respectively, may be considered to be separate portions of a continuous, or substantially continuous, conduit that is contained within outer housing 95. A barrier 26 separates region 22 from region 22' and prevents, occludes, and/or decreases direct fluid communication between regions 22 and 22'. Instead, fluid communication between regions 22 and 22' may be accomplished by flowing through first perforated region 40, slurry conduit 30, and second perforated region 50.

FIGS. 9 and 10 provide yet another illustrative, non-exclusive example of slurry separation assemblies 10 according to the present disclosure. As discussed in more detail herein, body 20, including elements or regions 22 and 22', may include any suitable form, including the planar elements or regions 22 and 22' of FIGS. 9 and 10. Fluid, or stream, flow in FIGS. 9 and 10 is substantially similar to that of FIGS. 1-6. In the forward-flow configuration, displacing fluid stream 80 may be supplied to first conduit 44, and be injected through first perforated region 40 and into slurry conduit 30. Similarly, displaced fluid stream 90 may be produced from second perforated region 50 and flow into second conduit 54.

FIGS. 9 and 10 further illustrate that, as discussed in more detail herein, first perforated region 40 and/or second perforated region 50 may be included at any suitable (relative) location within slurry separation assembly 10 and/or body 20. Thus, and as shown in FIG. 9, it is within the scope of the present disclosure that first perforated region 40 may be generally opposed to second perforated region 50, such as when first perforated region 40 is spaced apart from second perforated region 50 in a direction that is generally perpendicular to a flow direction of slurry stream 60 but not in a direction that is generally parallel to the flow direction of slurry stream 60.

Similarly, and as shown in FIG. 10, it is within the scope of the present disclosure that first perforated region 40 may be spaced apart from second perforated region 50 in a direction that is generally perpendicular to the flow direction of slurry stream 60 and in a direction that is generally parallel to the flow direction of slurry stream 60. FIGS. 9 and 10 also illustrate that first perforated region 40 and/or second perforated region 50 may be discontinuous, such as discontinuous in a direction that is parallel to the flow direction of slurry stream 60, that conduit barriers 45, 55 may control and/or direct fluid flow within slurry separation assembly 10, and/or that fluid impervious regions 28 may separate one or more perforated region(s) associated with slurry separation assembly 10.

Figure 11:
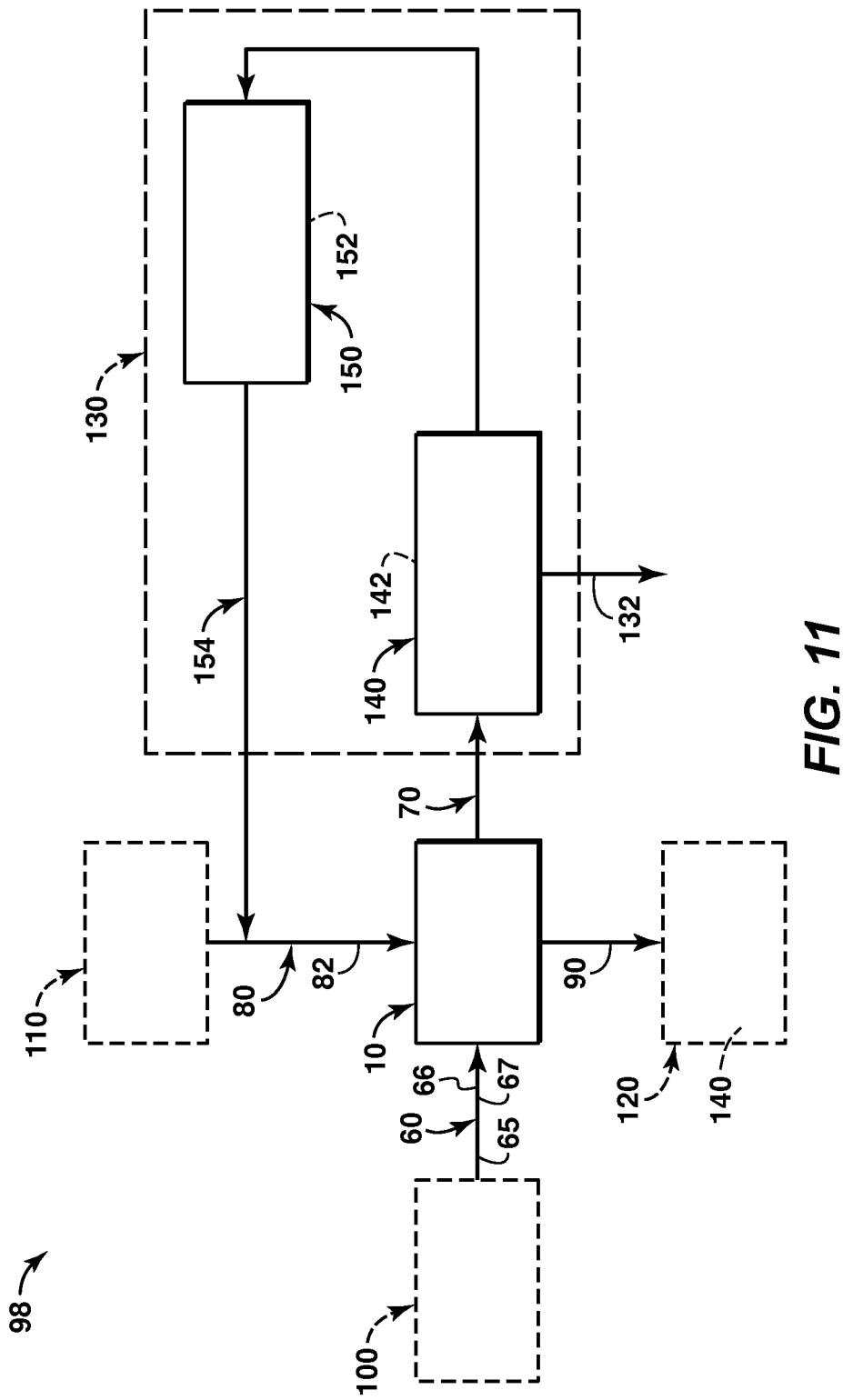
FIG. 11 is a schematic representation of a dewatering system according to the present disclosure.
Figure 12:
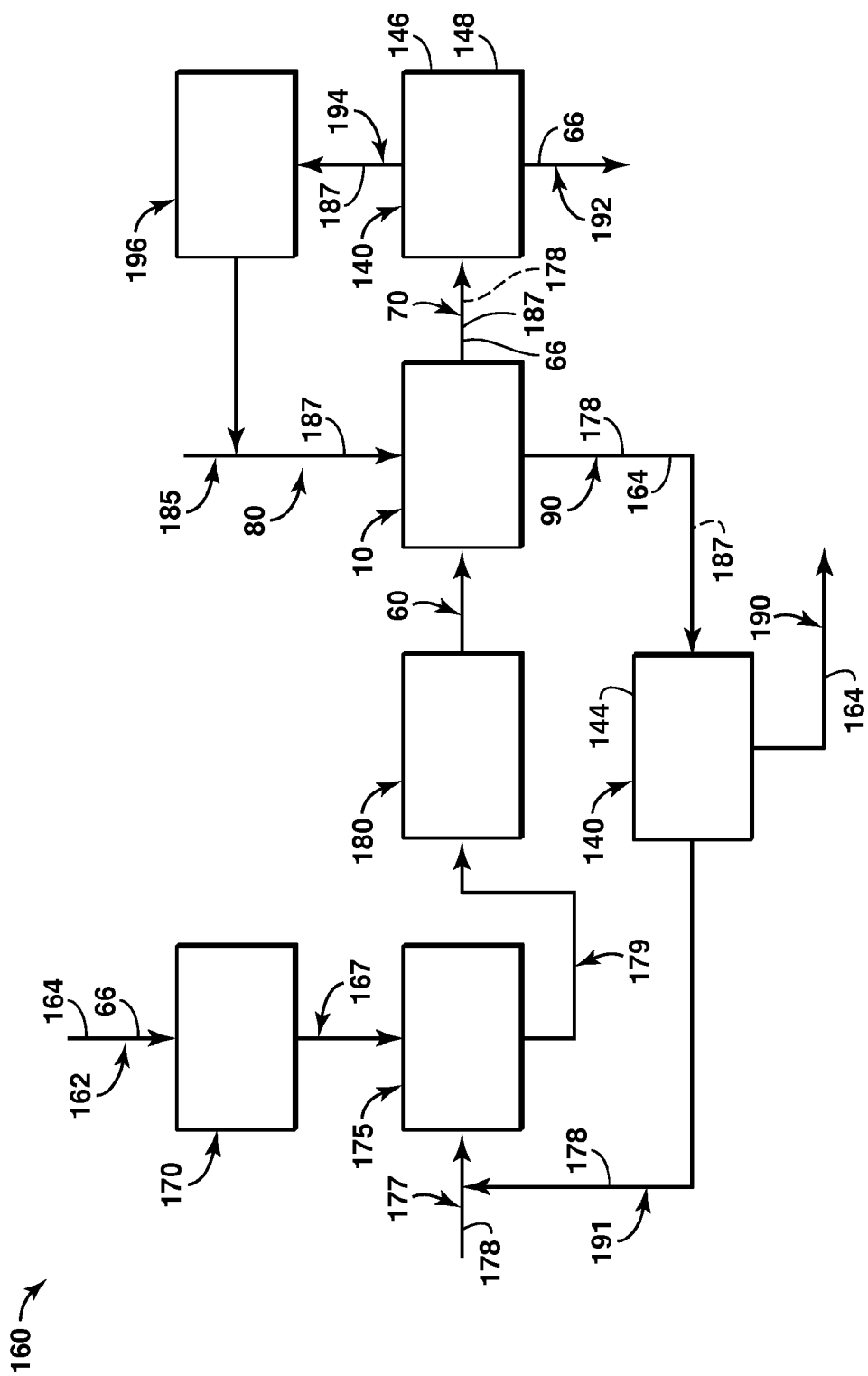
FIG. 12 is a schematic representation of a solvent extraction system according to the present disclosure.
Figure 13:
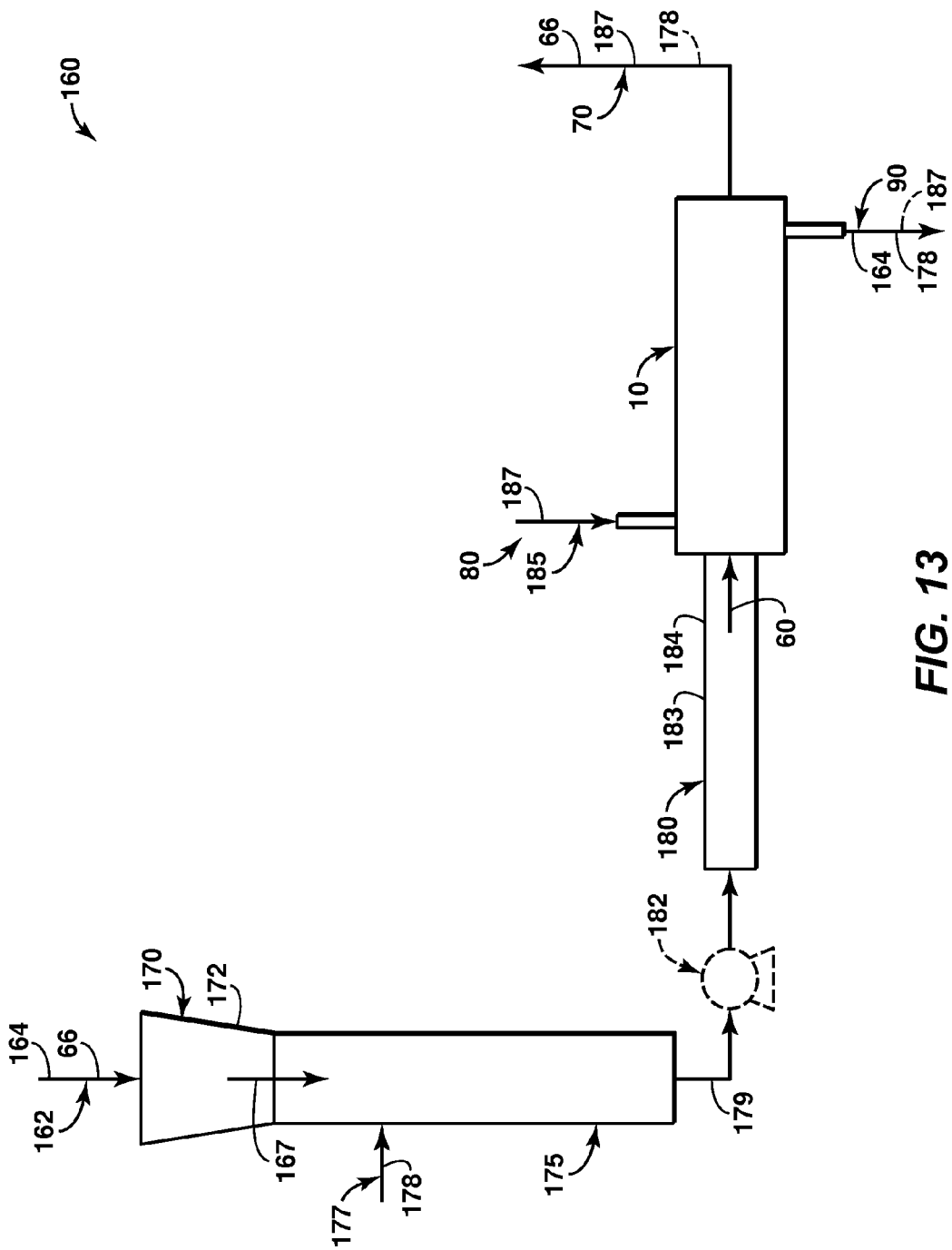
FIG. 13 is a less schematic but still illustrative, non-exclusive example of a solvent extraction system according to the present disclosure.

The slurry separation assemblies disclosed herein may be utilized in any suitable manner and/or in any suitable system, apparatus, process, and/or assembly. Illustrative, non-exclusive examples of systems, apparatus, processes, and/or assemblies that may utilize the slurry separation assemblies disclosed herein are shown in FIGS. 11-13. FIG. 11 provides an illustrative, non-exclusive example of a dewatering system 98 according to the present disclosure, while FIGS. 12-13 provide illustrative, non-exclusive examples of systems according to the present disclosure for the solvent extraction of mined oil sands.

In FIG. 11, a slurry stream 60 is supplied by an optional slurry stream delivery system 100 to a slurry separation assembly 10. In addition, a displacing fluid stream 80 is supplied to the slurry separation assembly by an optional displacing fluid delivery system 110. As discussed in more detail herein, slurry separation assembly 10 produces displaced fluid stream 90 and product slurry stream 70 from the streams supplied thereto. Displaced fluid stream 90 may be supplied to an optional displaced fluid receiving system 120 and/or product slurry stream 70 may be supplied to an optional product slurry receiving system 130 for further processing.

Slurry stream delivery system 100 may include any suitable structure configured to supply slurry stream 60 to slurry separation assembly 10. Similarly, displacing fluid delivery system 110 may include any suitable structure configured to supply displacing fluid stream 80 to slurry separation assembly 10. These may include any suitable collection of conduits, pipes, valves, pumps, compressors, storage tanks, mixers, grinders, system controllers, transducers, and/or actuators.

In the illustrative, non-exclusive example of FIG. 11, slurry stream 60 may include water 65, as well as mine tailings 67 from a mining operation. Mine tailings 67 may include small/fine particles 66. Displacing fluid stream 80 may supply any suitable fluid that may displace the water from the mine tailings, illustrative, non-exclusive examples of which include a gas, air, nitrogen, carbon dioxide, steam, methane, natural gas, and/or a liquid.

It is within the scope of the present disclosure that at least an elevated pressure portion of dewatering system 98, such as slurry separation assembly 10, slurry stream delivery system 100, and/or displacing fluid delivery system 110 may be configured to be operated at elevated pressures, including pressures of at least 1 Megapascal (MPa), at least 2 MPa, at least 3 MPa, at least 5 MPa, at least 10 MPa, at least at least 20 MPa, at least 30 MPa, at least 40 MPa, at least 45 MPa, at least 50 MPa, at least 55 MPa, at least 60 MPa, at least 65 MPa, at least 70 MPa, at least 75 MPa, at least 80 MPa, at least 90 MPa, or at least 100 MPa.

In addition, it is within the scope of the present disclosure that displacing fluid stream 80 may include a component that is a gas or vapor at ambient temperatures and pressure but that may exist in a liquid, or supercritical, state at the elevated pressures present within the elevated pressure portion of dewatering system 98. Illustrative, non-exclusive examples of components that may be liquefied at the elevated pressures present within the elevated pressure portion of the dewatering system include propane, butane, dimethylether, and/or carbon dioxide. Thus, displacing fluid stream 80 may act as a liquid, or quasi-liquid, within slurry separation assembly 10 but may be readily vaporized at ambient temperatures and pressures to facilitate separation of the displacing fluid stream from displaced fluid stream 90 and/or product slurry stream 70.

Displaced fluid receiving system 120 may receive displaced fluid stream 90 from slurry separation assembly 10 and may process, store, utilize, and/or otherwise dispose of at least a portion of the displaced fluid stream. As an illustrative, non-exclusive example, displaced fluid stream 90 may include a portion of displacing fluid stream 80, and the displaced fluid receiving system may include a separation assembly 140 configured to separate the components of the displaced fluid stream. As another illustrative, non-exclusive example, the displaced fluid receiving system may include a suitable tank, reservoir, and/or pond configured to store water 65 removed from the mine tailings stream.

Product slurry receiving system 130 may receive product slurry stream 70, which may include at least a portion of small particles 66 from mine tailings 67, as well as displacing fluid 82 from displacing fluid stream 80, and to separate at least a portion of the displacing fluid from at least a portion of the small particles to produce a dried mine tailings stream 132. This may be accomplished through the use of a separation assembly 140, such as a depressurization assembly 142, that is configured to decrease a pressure of the product slurry stream and vaporize displacing fluid 82 therefrom. Product slurry receiving system 140 further may include a recycling assembly 150, which may include a compressor 152, and may be configured to return at least a portion of the displacing fluid removed from the product slurry stream to the displacing fluid delivery system and/or the slurry separation assembly as a recycle stream 154.

FIG. 12 provides a schematic representation of an illustrative, non-exclusive example of a solvent extraction system 160 according to the present disclosure. The solvent extraction system of FIG. 12 may be utilized to remove solvent from mined oil sands. In the system of FIG. 12, an oil sands stream 162, including a hydrocarbon 164 and solid particles 66, may be supplied to a sizing system 170 that may grind, crush, sort, segregate, and/or otherwise ensure a desired, or target, average size of the oil sands and produce a sized oil sands stream 167. As an illustrative, non-exclusive example, the sized oil sands stream may include clumps that include a maximum dimension of less than 1 meter, such as maximum dimensions of less than 0.75 meters, less than 0.5 meters, less than 0.4 meters, less than 0.3 meters, less than 0.2 meters, or less than 0.1 meters. The sized oil sands stream may be supplied to a blend system 175, which may combine the sized oil sands stream with a heavy solvent stream 177, including a heavy solvent 178, which may solubilize, or dissolve, at least a portion of hydrocarbon 164, such as oil, tar, and/or bitumen, contained within the oil sands, to produce an oil sands-solvent mixture stream 179.

The oil sands-solvent mixture stream may be supplied to an agitation system 180, which may further combine the oil sands-solvent mixture to produce a slurry stream 60. The slurry stream may be supplied to a slurry separation assembly 10 together with a displacing fluid stream 80, such as a light solvent stream 185 including a light solvent 187. The light solvent stream may displace at least a portion of the slurry liquid, such as heavy solvent 178, from slurry stream 60, and the slurry separation assembly may produce a displaced fluid stream 90, including the dissolved portion of hydrocarbon 164, heavy solvent 178, and optionally light solvent 187. Slurry separation assembly 10 also may produce a product slurry stream 70, including solid particles 66, light solvent 187, and optionally heavy solvent 178.

As used herein, "light solvent" and "heavy solvent" refer to the relative physical characteristics of the solvents. As an illustrative, non-exclusive example, a heavy solvent may have a higher molecular weight than a light solvent. As another illustrative, non-exclusive example, a heavy solvent may have a lower vapor pressure at a given temperature than a light solvent. As yet another illustrative, non-exclusive example, at a given pressure, a heavy solvent may have a higher bubble point, or boiling point, temperature than a light solvent. Likewise, a light solvent may be described as having a lower molecular weight, a higher vapor pressure (at a given temperature), and/or a lower bubble or boiling point (at a given pressure) than a heavy solvent.

Displaced fluid stream 90 may be supplied to a separation assembly 140, such as displaced fluid separation assembly 144, which may separate the components thereof. This may include separating the displaced fluid stream into a produced hydrocarbon stream 190, including a recovered portion of hydrocarbon 164, and a recovered heavy solvent stream 191, including a recovered portion of heavy solvent 178. The recovered heavy solvent stream may be supplied to blend system 175 as at least a portion of heavy solvent stream 177.

Similarly, product slurry stream 70 may be supplied to a separation assembly 140, such as to product slurry separation assembly 146, or an evaporation system 148, which may separate the components thereof. This may include separating the product slurry stream into a dried solid particles stream 192, including solid particles 66, and a recovered light solvent stream 194, including light solvent 187. The recovered light solvent stream may receive further processing, such as in liquification apparatus 196, before being returned to slurry separation assembly 10 as at least a portion of displacing fluid stream 80.

FIG. 13 provides a less schematic but still illustrative, non-exclusive example of another solvent extraction system 160 according to the present disclosure. In the solvent extraction system of FIG. 13, oil sands stream 162, including hydrocarbons 164 and small particles 66, is supplied to sizing system 170 in the form of a grinder 172, which may produce a sized oil sands stream 167. The sized oil sands stream may be combined with a heavy solvent stream 177, including heavy solvent 178, in blend system 175 to produce an oil sands-solvent mixture stream 179. An optional pump 182 may provide a motive force to oil sands-solvent mixture stream 170 as it is supplied to agitation system 180, which may include static mixers 183 and/or a flow line 184, and may produce slurry stream 60.

The slurry stream, together with displacing fluid stream 80 in the form of light solvent stream 185, including light solvent 187, may be provided to slurry separation assembly 10, which may separate these streams into displaced fluid stream 90, including hydrocarbon 164 and heavy solvent 178, and optionally including light solvent 187, and product slurry stream 70, including solid particles 66 and light solvent 187, and optionally including heavy solvent 178. As discussed in more detail herein, displaced fluid stream 90 and/or product slurry stream 70 may optionally receive further processing to separate, recycle, and/or recover the components thereof.

FIGS. 12 and 13 provide illustrative, non-exclusive examples of solvent extraction systems 160 according to the present disclosure. These solvent extraction systems may include any suitable components and receive and/or produce any suitable streams. As an illustrative, non-exclusive example, oil sands stream 162 may include any suitable stream that may contain hydrocarbon 164 and solid particles 66. The hydrocarbon may include oil, crude oil, bitumen, tar, and/or any other suitable hydrocarbon. Similarly, the solid particles may be of any suitable size, shape, and/or composition, illustrative, non-exclusive examples of which are discussed in more detail herein and may include clay, sand, rock, and/or soil.

Sizing system 170, such as grinder 172, may include any suitable structure configured to size, sort, crush, grind, or otherwise produce sized oil sands stream 167 including a desired, or target, size of solid particles 66. Heavy solvent 178 may include any suitable heavy solvent that may dissolve, or solubilize, at least a portion of the hydrocarbons contained within oil sands stream 162. Illustrative, non-exclusive examples of heavy solvents 178 according to the present disclosure include diesel fuel, kerosene, fuel oil, and/or hydrocarbons, including hydrocarbons with an average molecular weight of at least 150 grams/mole, at least 175 grams/mole, at least 200 grams/mole, at least 225 grams/mole, at least 250 grams/mole, at least 275 grams/mole, or at least 300 grams/mole. Additionally or alternatively, it is within the scope of the present disclosure that heavy solvent 178 may include any suitable solvent with a vapor pressure of less than 20 kilopascal (kPa) at 20° C., including heavy solvents with a vapor pressure of less than 15, less than 10, less than 6.9, less than 5, less than 1, less than 0.1, less than 0.05, less than 0.01, less than 0.005, less than 0.001, less than 0.0005, or less than 0.0001 kPa at 20° C.

It is within the scope of the present disclosure that the heavy solvent may be combined with the oil sands stream 162 and/or the sized oil sands stream 167 at any suitable location. As an illustrative, non-exclusive example, blend system 175 may include a vertical column as shown schematically in FIG. 13 and heavy solvent stream 178 may be injected into the blend system sufficiently low on the vertical column such that a pressure head of the oil sands above the injection point is sufficient to decrease, minimize, or even prevent an escape of heavy solvent vapor from the top of the vertical column.

Pump 182 may include any suitable pump configured to supply a motive force to oil sands-solvent mixture stream 179 and may be designed to resist wear and/or damage when pumping a stream that includes solid particles, such as oil sands-solvent mixture stream 179. Additionally or alternatively, it is within the scope of the present disclosure that pump 182 may not be utilized within solvent extraction system 160 and that the motive force for oil sands-solvent mixture stream 179 may be provided by gravitational forces, hydraulic forces, and/or another suitable source.

Agitation system 180 may include any structure configured to further combine, or mix, the components of oil sands-solvent mixture stream 179 and may include active and/or passive components. Illustrative, non-exclusive examples of active components according to the present disclosure include blades, grinders, mills, and/or other apparatus configured to shear, combine, or otherwise mix the components of a stream supplied thereto. Illustrative, non-exclusive examples of passive components according to the present disclosure include static mixers and/or long flow conduits. As an illustrative, non-exclusive example, agitation system 180 may include static mixers 183 contained within a flow line 184. Static mixers 183 may be configured to impart mixing forces to oil sands-solvent mixture stream 179 flowing thereby.

As another illustrative, non-exclusive example, agitation system 180 may include a long flow line, such as a long pipe, that may provide a significant residence time with the agitation system, thereby promoting and/or increasing the mixing within oil sands-solvent mixture stream 179. Illustrative, non-exclusive examples of long flow lines according to the present disclosure include flow lines of at least 100 meters in length, such as flow lines of at least 150 meters, at least 200 meters, at least 250 meters, at least 300 meters, at least 350 meters, at least 400 meters, at least 450 meters, or at least 500 meters in length. Additionally or alternatively, flow line 184 may include a characteristic cross-sectional dimension and a length of the flow line may be selected such that it is at least 50 times, at least 100 times, at least 250 times, at least 500 times, at least 750 times, at least 1000 times, at least 1250 times, or at least 1500 times the characteristic cross-sectional dimension.

Light solvent 187 may include any suitable solvent that may be selected to displace at least a portion of heavy solvent 178 from slurry stream 60. This may include any of the displacing fluid streams disclosed herein. Additionally or alternatively, it is within the scope of the present disclosure that, as discussed in more detail herein, the light solvent may include a light solvent that may be readily vaporized and/or liquefied within solvent extraction system 160, such as a light solvent that may be liquefied at the pressures present within slurry separation assembly 10 but may be readily vaporized for separation from product slurry stream 70 at a pressure that is near atmospheric pressure. Illustrative, non-exclusive examples of light solvents according to the present disclosure include hydrocarbons with a vapor pressure of at least 1 kPa at 20° C., including hydrocarbons with a vapor pressure of at least 10 kPa, at least 25 kPa, at least 50 kPa, at least 75 kPa, at least 100 kPa, at least 150 kPa, at least 200 kPa, at least 250 kPa, at least 300 kPa, at least 400 kPa, or at least 500 kPa at 20° C. Illustrative, non-exclusive examples of light solvents according to the present disclosure include propane, butane, carbon dioxide, and/or dimethylether.

Figure 14:
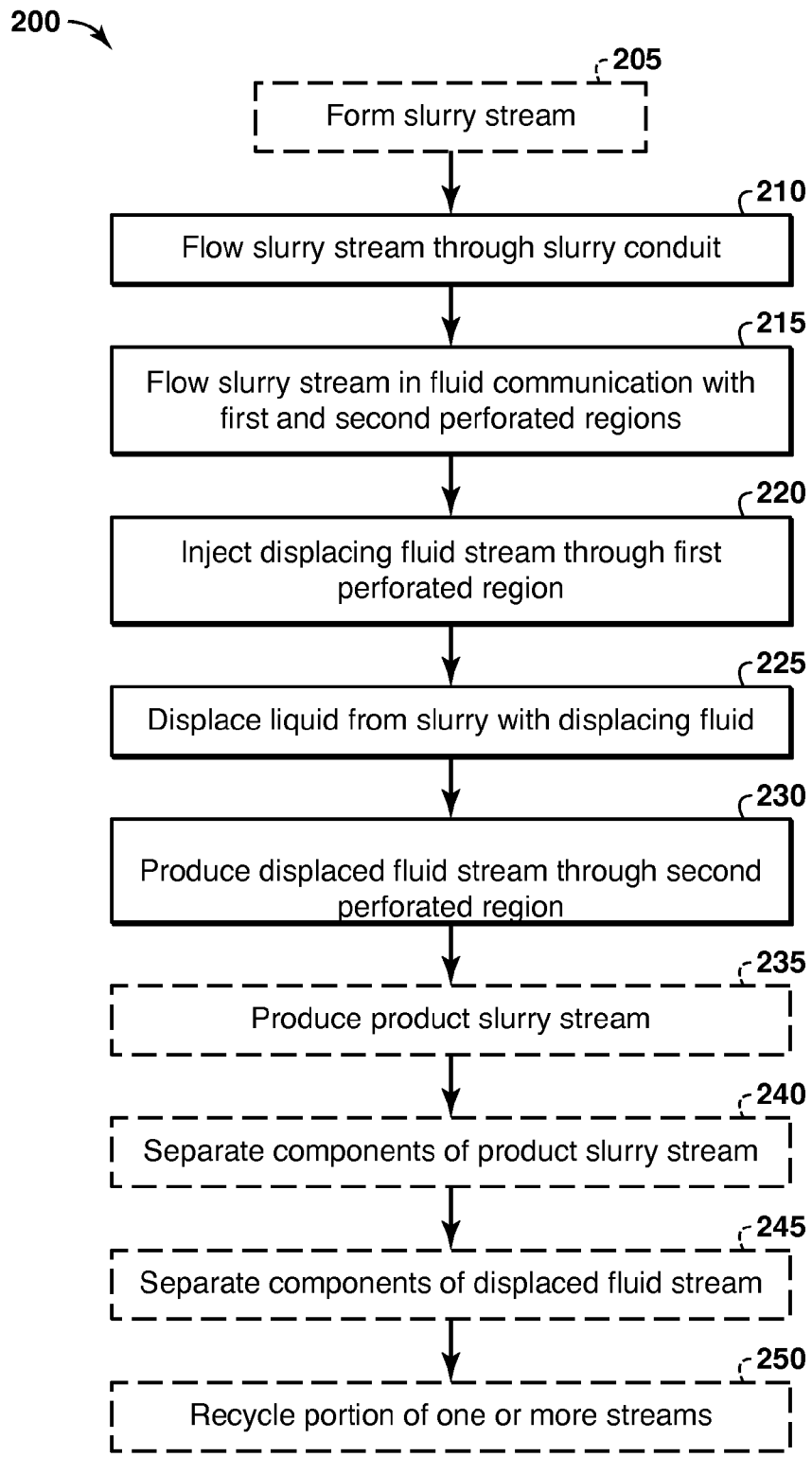
FIG. 14 is a flowchart depicting methods according to the present disclosure for separating slurry components.

FIG. 14 is a flowchart providing illustrative, non-exclusive examples of methods 200 of removing fluid from a slurry according to the present disclosure. The methods further include flowing the slurry stream through a slurry conduit at 210, and flowing the slurry stream in fluid communication with a first perforated region and a second perforated region at 215. As indicated in dashed lines at 205, the methods of FIG. 14 may optionally include forming a slurry stream. The methods further include injecting a displacing fluid stream through the first perforated region and into the slurry conduit at 220, displacing slurry liquid from the slurry with the displacing fluid stream at 225, and producing a displaced fluid stream from the slurry conduit and through the second perforated region at 230. The methods optionally may further include one or more of producing a product slurry stream at 235, separating components of the product slurry stream at 240, separating components of the displaced fluid stream at 245, and/or recycling at least a portion of one or more of the product slurry stream and the displaced slurry stream at 250.

Forming the slurry stream at 205, when utilized in a method 200 according to the present disclosure, may include the use of any suitable structure and/or method to form the slurry stream, including the illustrative, non-exclusive examples disclosed herein. As an illustrative, non-exclusive example, it is within the scope of the present disclosure that forming the slurry stream may include producing a mine tailings stream from a mining operation. As another illustrative, non-exclusive example, forming the slurry stream may include combining an oil sands stream with a heavy solvent stream. As yet another illustrative, non-exclusive example, forming the slurry stream may include mixing any suitable solid particles from any suitable solid particle source, or stream, with any suitable liquid from any suitable liquid source, or stream. As another illustrative, non-exclusive example, forming the slurry stream may include pumping the slurry stream from any suitable slurry source. As yet another illustrative, non-exclusive example, forming the slurry stream may include supplying the slurry stream from any suitable slurry stream delivery system configured to provide the slurry stream to the slurry conduit.

Flowing the slurry stream through the slurry conduit at 210 and/or flowing the slurry stream in fluid communication with the first perforated region and the second perforated region at 215 may include flowing the slurry stream through any suitable slurry conduit that is in fluid communication with the first and second perforated regions, illustrative, non-exclusive examples of which are discussed in more detail herein with reference to previously discussed slurry conduit 30, first perforated region 40, and/or second perforated region 50. Injecting the displacing fluid stream through the first perforated region at 220 may include providing the displacing fluid stream to the first perforated region at a pressure that is sufficient to provide for flow of the displacing fluid stream therethrough. It is within the scope of the present disclosure that injecting the displacing fluid stream through the first perforated region optionally may include the use of any suitable displacing fluid delivery system to provide the displacing fluid stream to the first perforated region and/or to inject the displacing fluid stream through the first perforated region and into the slurry conduit.

Displacing slurry liquid from the slurry with the displacing fluid stream at 225 may include the use of any suitable mechanism to displace from the slurry stream at least a portion of the slurry liquid contained within the slurry stream. This may include pressure-driven displacement of the slurry liquid from the slurry stream, as well as displacement that is driven by thermodynamic interactions, illustrative, non-exclusive examples of which include interfacial chemistry, surface energy, and/or surface wetting. It is within the scope of the present disclosure that the displacing may include displacing all, or substantially all, of the slurry liquid from the slurry with the displacing fluid stream. However, it is also within the scope of the present disclosure that the displacing may include displacing a displaced fraction, or portion, of the slurry liquid from the slurry stream. Illustrative, non-exclusive examples of displaced fractions according to the present disclosure include displaced fractions of 10-100 wt % of the slurry liquid, including displaced fractions of 20-95 wt %, 30-90 wt %, 50-99 wt %, greater than 50 wt %, greater than 60 wt %, greater than 70 wt %, greater than 75 wt %, greater than 80 wt %, greater than 90 wt %, greater than 95 wt %, greater than 99 wt %, or greater than 99.5 wt % of the slurry liquid.

Producing the displaced fluid stream through the second perforated region at 230 may include flowing the displaced fluid stream through the second perforated region. It is within the scope of the present disclosure that this may include maintaining a pressure of the displaced fluid stream to be less than a pressure within the slurry conduit. It is also within the scope of the present disclosure that producing the displaced fluid stream may include the use of any suitable displaced fluid receiving system configured to receive the displaced fluid stream from the second perforated region and/or to control the pressure of the displaced fluid stream.

Producing the product slurry stream at 235 may include producing the product slurry stream from an exit of the slurry separation assembly, such as the previously described product slurry stream 70 and slurry separation assembly 10. It is within the scope of the present disclosure that producing the product slurry stream may include the use of any suitable product slurry receiving system configured to receive the product slurry stream, perform additional processing on the product slurry stream, and/or store the product slurry stream.

Separating the components of the product slurry stream at 240 and/or separating the components of the displaced fluid stream at 245 may include the use of any suitable structure and/or methods, including those discussed in more detail herein, to separate the components thereof, such as to separate the solid particles contained within the product slurry stream from the slurry liquid and/or displacing fluid contained therein and/or to separate the slurry liquid contained within the displaced fluid stream from the displacing fluid contained therein. It is within the scope of the present disclosure that this separation may include the use of any suitable separation assembly, illustrative, non-exclusive examples of which may include any suitable evaporator, throttle valve, distillation system, phase separation device, liquid-vapor separator, solid-liquid separator, and/or solid-vapor separator.

It is also within the scope of the present disclosure that the separating may include separating a substantial portion of the solid particles contained within the product slurry stream from the slurry liquid and/or displacing fluid contained therein. As an illustrative, non-exclusive example, this may include separating at least 50 wt % of the slurry liquid and/or displacing fluid from the solid particles contained within the slurry stream, including separating at least 60 wt %, at least 70 wt %, at least 75 wt %, at least 80 wt %, at least 90 wt %, at least 95 wt %, at least 99 wt %, or at least 99.5 wt % of the slurry liquid and/or displacing fluid from the solid particles contained within the slurry stream.

Recycling at least a portion of one or more of the product slurry stream and the displaced fluid stream at 250 may include the use of any suitable structure and/or methods to re-use at least a portion of one or more of the product slurry stream and the displaced fluid stream, including the illustrative, non-exclusive examples of recycling assemblies 150 discussed in more detail herein. As an illustrative, non-exclusive example, it is within the scope of the present disclosure that at least a portion of the displacing fluid that is separated from the displaced fluid stream at 245 and/or from the product slurry stream at 245 may be injected through the first perforated region at 220.

It is within the scope of the present disclosure that at least two of the method steps described in FIG. 14 may be performed simultaneously and/or continuously. This may include performing at least three, at least four, at least five, at least six, at least seven, at least eight, at least nine, or all 10 of the method steps described in FIG. 14 simultaneously and/or continuously. As an illustrative, non-exclusive example, the flowing at 210 and 215, the injecting at 220, the displacing at 225, and the producing at 230 may be performed simultaneously and/or continuously. It is also within the scope of the present disclosure that, as discussed in more detail herein, methods 200 also may include reversing the injecting and the producing such that the displacing fluid stream may be injected into the slurry conduit through the second perforated region and the displaced fluid stream may be produced from the slurry conduit through the first perforated region.

It is further within the scope of the present disclosure that methods 200 also may include controlling, or maintaining, one or more pressures within the slurry separation assembly. As an illustrative, non-exclusive example, methods 200 may include at least one of maintaining a pressure of the displacing fluid stream to be higher than a pressure of the slurry stream, maintaining the pressure of the slurry stream to be higher than a pressure of the displaced fluid stream, and/or maintaining the pressure of the displacing fluid stream to be higher than the pressure of the displaced fluid stream.

The systems and methods disclosed herein have been described with reference to several different embodiments. It is within the scope of the present disclosure that any structure and/or function disclosed herein may be utilized in any suitable manner and with any of the embodiments disclosed herein. It is also within the scope of the present disclosure that the systems disclosed herein may further include any suitable valve, conduit, pump, and/or other structure configured to control a flow of fluids and/or streams therethrough, including valves, pumps, and/or conduits that may control the supply of the slurry stream and/or the displacing fluid stream to the slurry separation assembly, valves, pipes, and/or conduits that may control the removal of the product slurry stream and/or the displaced fluid stream from the slurry separation assembly, and/or valves, pumps, and/or conduits that may provide a mechanism by which the injecting and the producing may be reversed, as discussed in more detail herein.

In the present disclosure, several of the illustrative, non-exclusive examples have been discussed and/or presented in the context of flow diagrams, or flow charts, in which the methods are shown and described as a series of blocks, or steps. Unless specifically set forth in the accompanying description, it is within the scope of the present disclosure that the order of the blocks may vary from the illustrated order in the flow diagram, including with two or more of the blocks (or steps) occurring in a different order and/or concurrently.

As used herein, the term "and/or" placed between a first entity and a second entity means one of (1) the first entity, (2) the second entity, and (3) the first entity and the second entity. Multiple entities listed with "and/or" should be construed in the same manner, i.e., "one or more" of the entities so conjoined. Other entities may optionally be present other than the entities specifically identified by the "and/or" clause, whether related or unrelated to those entities specifically identified. Thus, as a non-limiting example, a reference to "A and/or B," when used in conjunction with open-ended language such as "comprising" may refer, in one embodiment, to A only (optionally including entities other than B); in another embodiment, to B only (optionally including entities other than A); in yet another embodiment, to both A and B (optionally including other entities). These entities may refer to elements, actions, structures, steps, operations, values, and the like.

As used herein, the phrase "at least one," in reference to a list of one or more entities should be understood to mean at least one entity selected from any one or more of the entity in the list of entities, but not necessarily including at least one of each and every entity specifically listed within the list of entities and not excluding any combinations of entities in the list of entities. This definition also allows that entities may optionally be present other than the entities specifically identified within the list of entities to which the phrase "at least one" refers, whether related or unrelated to those entities specifically identified. Thus, as a non-limiting example, "at least one of A and B" (or, equivalently, "at least one of A or B," or, equivalently "at least one of A and/or B") may refer, in one embodiment, to at least one, optionally including more than one, A, with no B present (and optionally including entities other than B); in another embodiment, to at least one, optionally including more than one, B, with no A present (and optionally including entities other than A); in yet another embodiment, to at least one, optionally including more than one, A, and at least one, optionally including more than one, B (and optionally including other entities). In other words, the phrases "at least one," "one or more," and "and/or" are open-ended expressions that are both conjunctive and disjunctive in operation. For example, each of the expressions "at least one of A, B and C," "at least one of A, B, or C," "one or more of A, B, and C," "one or more of A, B, or C" and "A, B, and/or C" may mean A alone, B alone, C alone, A and B together, A and C together, B and C together, A, B and C together, and optionally any of the above in combination with at least one other entity.

In the event that any of the references that are incorporated by reference herein define a term in a manner or are otherwise inconsistent with either the non-incorporated portion of the present disclosure or with any of the other incorporated references, the non-incorporated portion of the present disclosure shall control, and the term or incorporated disclosure therein shall only control with respect to the reference in which the term is defined and/or the incorporated disclosure was originally present.

As used herein the terms "adapted" and "configured" mean that the element, component, or other subject matter is designed and/or intended to perform a given function. Thus, the use of the terms "adapted" and "configured" should not be construed to mean that a given element, component, or other subject matter is simply "capable of" performing a given function but that the element, component, and/or other subject matter is specifically created for the purpose of performing the function. It is also within the scope of the present disclosure that elements, components, and/or other recited subject matter that is recited as being adapted to perform a particular function may additionally or alternatively be described as being configured to perform that function, and vice versa.

Illustrative, non-exclusive examples of systems and methods according to the present disclosure are presented in the following enumerated paragraphs. It is within the scope of the present disclosure that an individual step of a method recited herein, including in the following enumerated paragraphs, may additionally or alternatively be referred to as a "step for" performing the recited action.

A1. A method for removing fluid from a slurry, the method comprising:

flowing the slurry over a plurality of perforated surfaces that includes at least a first perforated surface and a second perforated surface, wherein the slurry comprises a first fluid and solid particles, and optionally wherein the flowing includes flowing in a flow direction, and further optionally wherein the flow direction is generally parallel to at least one of the first perforated surface and the second perforated surface;

injecting a second fluid through the first perforated surface, wherein the first fluid and the second fluid include different chemical compositions; and removing a mixture of the first fluid and the second fluid through the second perforated surface.

A2. The method of paragraph A1, wherein at least one of the perforated surfaces includes a porous surface, and optionally wherein both of the perforated surfaces include porous surfaces.

A3. The method of any of paragraphs A1-A2, wherein at least one of the first perforated surface and the second perforated surface includes perforations, and optionally wherein at least a portion of the perforations is in fluid communication with a flow port, and further optionally wherein at least a portion of the perforations is in fluid communication with a plurality of flow ports.

A4. The method of any of paragraphs A1-A3, wherein the flowing, injecting, and removing are simultaneous.

A5. The method of any of paragraphs A1-A4, wherein the second fluid includes hydrocarbons, and optionally wherein the second fluid includes at least 30 wt % hydrocarbons, further optionally including at least 40 wt %, at least 50 wt %, at least 60 wt %, or at least 70 wt % hydrocarbons, and further optionally wherein the hydrocarbons have an average molecular weight of 200 grams/mole or less, optionally including an average molecular weight of 150 grams/mole or less, 100 grams/mole or less, 60 grams/mole or less, or 50 grams/mole or less.

A6. The method of any of paragraphs A1-A5, wherein the second fluid includes carbon dioxide, and optionally wherein the second fluid includes at least 25 wt % carbon dioxide, and further optionally wherein the second fluid includes at least 30 wt %, at least 35 wt %, at least 40 wt %, at least 45 wt %, at least 50 wt %, at least 55 wt %, at least 60 wt %, at least 65 wt %, at least 70 wt %, or at least 75 wt % carbon dioxide.

A7. The method of any of paragraphs A1-A6, wherein at least one of the first fluid and the second fluid includes at least one of a gas phase fluid, a vapor phase fluid, a liquid phase fluid, a supercritical fluid, and a dense supercritical fluid, and optionally wherein at least one of the first fluid and the second fluid is at least one of a gas phase fluid, a vapor phase fluid, a liquid phase fluid, a supercritical fluid, and a dense supercritical fluid.

A8. The method of any of paragraphs A1-A7, wherein the first fluid includes at least one of water and brine, and optionally wherein the first fluid is at least one of water and brine.

A9. The method of any of paragraphs A1-A8, wherein the plurality of perforated surfaces are in fluid communication with a slurry conduit, wherein the slurry conduit forms an annular space, and further wherein the flowing includes flowing the slurry within the annular space, and optionally wherein the plurality of perforated surfaces at least partially define the slurry conduit, and further optionally wherein the plurality of perforated surfaces completely define the slurry conduit.

A10. The method of any of paragraphs A1-A9, wherein the injecting and the removing include flowing at least one of the first fluid and the second fluid between the first perforated surface and the second perforated surface.

A11. The method of any of paragraphs A1-A10, wherein the method further includes periodically reversing the injecting and the removing, and optionally wherein the periodically reversing includes injecting the second fluid through the second perforated surface and removing the mixture of the first fluid and the second fluid through the first perforated surface.

A12. The method of any of paragraphs A1-A11, wherein each of the solid particles include a characteristic dimension, and further wherein at least 50 wt % of the solid particles with a characteristic dimension of less than 44 microns also have a characteristic dimension of less than 10 microns.

A13. The method of any of paragraphs A1-A12, wherein at least one of, and optionally both of, the first perforated surface and the second perforated surface includes perforations, and further wherein the perforations are sized to prevent at least 99.5 wt % of the solid particles from passing through the at least one of the first perforated surface and the second perforated surface, and optionally wherein the perforations are sized to prevent at least 99.5 wt % of the solid particles from passing through both the first perforated surface and the second perforated surface.

A14. The method of any of paragraphs A1-A13, the method further including separating at least a portion of the second fluid from the first fluid to form a recycle stream that includes the second fluid, and optionally wherein the method includes re-using at least a portion of the recycle stream during the injecting.

A15. The method of any of paragraphs A1-A14, the method further including forming the slurry, wherein forming the slurry includes combining the first fluid and the solid particles to form a slurry mixture, and optionally wherein forming the slurry further includes agitating the slurry mixture.

A16. The method of paragraph A1, wherein the agitating includes flowing the slurry mixture, and optionally wherein the flowing includes flowing through a pipe, optionally wherein the pipe is at least 300 meters in length.

A17. The method of any of paragraphs A15-A16, wherein the agitating includes flowing the slurry mixture through a static mixer, and optionally wherein the static mixer is contained within the pipe.

A18. The method of any of paragraphs A1-A17, wherein the method further includes evaporating at least a portion of the second fluid from the slurry, optionally including evaporating at least a substantial portion of the second fluid from the slurry, optionally including evaporating at least 50 wt %, at least 60 wt %, at least 70 wt %, at least 75 wt %, at least 80 wt %, at least 90 wt %, at least 95 wt %, at least 99 wt %, or at least 99.5 wt % of the second fluid from the slurry, and further optionally including evaporating all of the second fluid from the slurry.

A19. The method of any of paragraphs A1-A18, wherein the slurry includes sand, bitumen, and a hydrocarbon solvent, and optionally wherein the hydrocarbon solvent includes a molecular weight of less than 171 grams/mole.

A20. The method of any of paragraphs A1-A19, wherein the slurry includes tailing fines from a mining operation and water.

A21. The method of any of paragraphs A1-A20, wherein at least one, and optionally both, of the first perforated surface and the second perforated surface includes at least one of a wire mesh, a metal screen, a sintered metal, a porous ceramic, and a cemented rock.

A22. The method of any of paragraphs A1-A21, wherein flowing the slurry includes flowing the slurry using at least one of a laminar flow profile and a turbulent flow profile.

B1. A method for separating components of a slurry, the method comprising:
flowing a slurry stream that includes the slurry through a slurry conduit defined by a body, wherein the slurry conduit is in fluid communication with a first perforated region and a second perforated region, and further wherein the slurry includes a liquid and a plurality of solid particles;
injecting a displacing fluid through the first perforated region and into the slurry conduit as a displacing fluid stream; and
producing a displaced fluid stream from the slurry conduit through the second perforated region, wherein the displaced fluid stream includes at least a portion of the displacing fluid and at least a portion of the liquid from the slurry.

B2. The method of paragraph B1, wherein the flowing, the injecting, and the producing are simultaneous, and optionally wherein the flowing, the injecting, and the producing are continuous.

B3. The method of any of paragraphs B1-B2, wherein the method further includes displacing at least a portion of the liquid from the slurry with the displacing fluid stream to create a product slurry stream that includes at least a portion of the injected displacing fluid and at least a portion of the plurality of solid particles, and optionally wherein the product slurry stream includes a lower concentration of the liquid than the slurry stream.

B4. The method of paragraph B3, wherein the method further includes evaporating at least a portion of the displacing fluid from the product slurry stream to produce a dried slurry stream.

B5. The method of paragraph B4, wherein the evaporating includes evaporating substantially all, and optionally all, of the displacing fluid from the product slurry stream.

B6. Solid particles produced by the method of paragraph B5.

B7. The method of any of paragraphs B1-B6, wherein the injecting includes injecting the displacing fluid at an injection pressure that is greater than a pressure within the slurry conduit.

B8. The method of any of paragraphs B1-B7, wherein the producing includes producing the displaced fluid stream at a displaced fluid pressure that is less than a pressure within the slurry conduit.

B9. The method of any of paragraphs B1-B8, wherein the method further includes at least one of maintaining a pressure of the displacing fluid stream to be higher than a pressure of the slurry stream, maintaining the pressure of the slurry stream to be higher than a pressure of the displaced fluid stream, and maintaining the pressure of the displacing fluid stream to be higher than the pressure of the displaced fluid stream.

B10. The method of any of paragraphs B1-B9, wherein the method further includes separating the displaced fluid stream into a liquid stream and a recycle stream, wherein the liquid stream includes a lower concentration of the displacing fluid than the displaced fluid stream, and optionally wherein the recycle stream includes a higher concentration of the displacing fluid than the displaced fluid stream.

B11. The method of paragraph B10, wherein the method further includes injecting at least a portion of the recycle stream as at least a portion of the displacing fluid stream.

B12. The method of any of paragraphs B1-B11, wherein the method further includes forming the slurry stream.

B13. The method of paragraph B12, wherein forming the slurry stream includes combining a feedstock solids stream with a feedstock liquid stream to produce a slurry mixture from which the slurry stream is formed.

B14. The method of paragraph B13, wherein the method further includes agitating the slurry mixture.

B15. The method of paragraph B14, wherein the agitating includes flowing the slurry mixture, optionally wherein the flowing includes flowing the slurry mixture through a pipe, and further optionally wherein the flowing includes flowing the slurry mixture through a pipe of at least 100 meters in length, and optionally wherein the pipe is at least 150 meters, at least 200 meters, at least 250 meters, at least 300 meters, at least 350 meters, at least 400 meters, at least 450 meters, or at least 500 meters in length.

B16. The method of any of paragraphs B14-B15, wherein the agitating includes agitating the slurry mixture with a static mixer, and optionally wherein the static mixer is contained within the pipe.

B17. The method of any of paragraphs B1-B16, wherein the first perforated region includes a plurality of first perforations, and further wherein the injecting includes injecting the displacing fluid stream through at least a portion of the plurality of first perforations.

B18. The method of any of paragraphs B1-B17, wherein the first perforated region includes a first porous region including a plurality of first region pores, and further wherein the injecting includes injecting the displacing fluid stream through at least a portion of the plurality of first region pores.

B19. The method of any of paragraphs B1-B18, wherein the second perforated region includes a plurality of second perforations, and further wherein the producing includes producing the displaced fluid stream through at least a portion of the plurality of second perforations.

B20. The method of any of paragraphs B1-B19, wherein the second perforated region includes a second porous region including a plurality of second region pores, and further wherein the producing includes producing the displaced fluid stream through at least a portion of the plurality of second region pores.

B21. The method of any of paragraphs B1-B20, wherein at least one of the first perforated region and the second perforated region includes at least one of a wire mesh, a metal screen, a sintered metal, a porous ceramic, and cemented rock.

B22. The method of any of paragraphs B1-B21, wherein the first perforated region is generally opposed to the second perforated region.

B23. The method of any of paragraphs B1-B22, wherein the first perforated region is spaced apart from the second perforated region in a direction that is generally parallel to a slurry stream flow direction, and optionally in a direction that is generally perpendicular to the slurry stream flow direction.

B24. The method of any of paragraphs B1-B23, wherein the first perforated region and the second perforated region form a portion of an annular space, and optionally wherein the flowing includes flowing the slurry stream within the annular space, and further optionally wherein the first perforated region and the second perforated region define the annular space.

B25. The method of any of paragraphs B1-B24, wherein the body defines at least a portion of an annular space, and optionally wherein the flowing includes flowing the slurry stream within the annular space.

B26. The method of any of paragraphs B1-B25, wherein at least one of the first perforated region and the second perforated region is in fluid communication with a flow port.

B27. The method of paragraph B26, wherein at least one of the first perforated region and the second perforated region is in fluid communication with a plurality of flow ports, and further optionally wherein both the first perforated region and the second perforated region are in fluid communication with a plurality of flow ports.

B28. The method of any of paragraphs B1-B27, wherein the method further includes reversing the injecting and the producing, wherein the reversing includes injecting the displacing fluid stream through the second perforated region and producing the displaced fluid stream through the first perforated region.

B29. The method of paragraph B28, wherein a portion of the plurality of solid particles are contained within the second perforated region as contained solid particles, and further wherein the reversing includes removing a fraction of the contained solid particles from the second perforated region, and optionally wherein the fraction of the contained solid particles includes at least 50 wt % of the contained solid particles, optionally including at least 60 wt %, at least 70 wt %, at least 80 wt %, or at least 90 wt % of the contained solid particles.

B30. The method of any of paragraphs B28-B29, wherein the reversing includes at least one of periodically reversing and reversing responsive to the occurrence of an event.

B31. The method of paragraph B30, wherein the event includes detecting at least one of a flow rate of the displacing fluid stream that is less than a threshold magnitude, a flow rate of the slurry stream that is less than a threshold magnitude, a flow rate of the displaced fluid stream that is less than a threshold magnitude, a pressure differential between the displacing fluid stream and the slurry stream that is greater than a threshold magnitude, a pressure differential between the slurry stream and the displaced fluid stream that is greater than a threshold magnitude, and a pressure differential between the displacing fluid stream and the displaced fluid stream that is greater than a threshold magnitude.

B32. The method of any of paragraphs B1-B31, wherein the slurry includes sand, bitumen, and a hydrocarbon solvent, and optionally wherein the hydrocarbon solvent includes a molecular weight of less than 200 grams/mole, optionally including a molecular weight of less than 190 grams/mole, less than 180 grams/mole, less than 171 grams/mole, less than 170 grams/mole, less than 160 grams/mole, or less than 150 grams/mole.

B33. The method of paragraph B32, wherein at least a portion of the bitumen is dissolved within the hydrocarbon solvent, and further wherein the liquid includes the portion of the bitumen and the hydrocarbon solvent.

B34. The method of any of paragraphs B1-B33, wherein the slurry includes water and mine tailing fines from a mining operation.

B35. The method of any of paragraphs B1-B34, wherein the liquid includes at least one of water and brine, and optionally wherein the liquid is at least one of water and brine.

B36. The method of any of paragraphs B1-B35, wherein the displacing fluid includes at least 25 wt % hydrocarbons, optionally including at least 30 wt %, at least 40 wt %, at least 50 wt %, at least 60 wt %, at least 70 wt %, or at least 75 wt % hydrocarbons, and further optionally wherein the hydrocarbons include an average molecular weight of less than or equal to 250 grams/mole, optionally including an average molecular weight of less than or equal to 225 grams/mole, less than or equal to 200 grams/mole, less than or equal to 175 grams/mole, less than or equal to 150 grams/mole, less than or equal to 125 grams/mole, less than or equal to 100 grams/mole, less than or equal to 90 grams/mole, less than or equal to 80 grams/mole, less than or equal to 70 grams/mole, less than or equal to 60 grams/mole, less than or equal to 50 grams/mole, less than or equal to 40 grams/mole, or less than or equal to 30 grams/mole.

B37. The method of any of paragraphs B1-B36, wherein the displacing fluid includes at least 25 wt % carbon dioxide, optionally including at least 30 wt %, at least 35 wt %, at least 40 wt %, at least 45 wt %, at least 50 wt %, at least 55 wt %, at least 60 wt %, at least 65 wt %, at least 70 wt %, or at least 75 wt % carbon dioxide.

B38. The method of any of paragraphs B1-B37, wherein the displacing fluid includes at least one of a gas phase fluid, a vapor phase fluid, a liquid phase fluid, a supercritical fluid, and a dense supercritical fluid, and optionally wherein the displacing fluid is at least one of a gas phase fluid, a vapor phase fluid, a liquid phase fluid, a supercritical fluid, and a dense supercritical fluid.

B39. The method of any of paragraphs B1-B38, wherein the injecting and the producing include flowing at least a portion of at least one of the liquid and the displacing fluid between the first perforated region and the second perforated region.

B40. The method of any of paragraphs B1-B39, wherein at least one of the first perforated region and the second perforated region is sized to prevent at least 90 wt % of the plurality of solid particles from passing therethrough, and optionally wherein at least one of the first perforated region and the second perforated region is sized to prevent at least 92 wt %, 94 wt %, 96 wt %, 98 wt %, 99 wt %, 99.5 wt %, or 99.9 wt % of the plurality of solid particles from passing therethrough.

B41. The method of any of paragraphs B1-B40, wherein each of the plurality of solid particles includes a characteristic dimension, and further wherein at least 30 wt % of the plurality of solid particles with a characteristic dimension of less than 44 microns also have a characteristic dimension of less than 10 microns, and optionally wherein at least 40 wt %, at least 50 wt %, at least 60 wt %, or at least 70 wt % of the plurality of solid particles with a characteristic dimension of less than 44 microns also have a characteristic dimension of less than 10 microns.

B42. The method of any of paragraphs B1-B41, wherein the flowing includes flowing the slurry under at least one of a laminar flow profile and a turbulent flow profile.

C1. An apparatus for removing at least a portion of a first fluid from a slurry comprising the first fluid and solid particles, the apparatus comprising:
 a first perforated surface;
 a second perforated surface;
 a slurry conduit in fluid communication with the first perforated surface and the second perforated surface;
 a means for injecting a second fluid through the first perforated surface; and
 a means for removing a mixture of the first fluid and the second fluid through the second perforated surface.

C2. The apparatus of paragraph C1, wherein the apparatus further includes a means for injecting the second fluid through the second perforated surface.

C3. The apparatus of any of paragraphs C1-C2, wherein the apparatus further includes a means for removing the mixture of the first fluid and the second fluid through the first perforated surface.

C4. The apparatus of any of paragraphs C1-C3, wherein the slurry conduit forms an annular space through which the slurry flows.

C5. The apparatus of any of paragraphs C1-C4, wherein the apparatus further includes an outer housing, and further wherein the first perforated surface, the second perforated surface, and the slurry conduit are contained within the outer housing.

C6. The apparatus of paragraph C5, wherein the first perforated surface, the second perforated surface, and the outer housing form a pipe-in-pipe-in-pipe arrangement.

C7. The apparatus of any of paragraphs C1-C6, wherein the apparatus further includes a separation system for separating at least a portion of the second fluid from the mixture of the first fluid and the second fluid.

C8. The apparatus of paragraph C7, wherein the separation system includes at least one of a distillation system, a throttle valve, and a liquid-vapor separation assembly.

C9. The apparatus of any of paragraphs C7-C8, wherein the apparatus further includes a recycle system for reusing the second fluid separated from the mixture.

C10. The apparatus of any of paragraphs C1-C9, wherein at least one of the first perforated surface and the second perforated surface includes at least one of a wire mesh, a metal screen, a sintered metal, a porous ceramic, or a cemented rock.

C11. The apparatus of any of paragraphs C1-C10, wherein at least one of the first perforated surface and the second perforated surface is configured to be removed from the apparatus.

C12. The apparatus of any of paragraphs C1-C11, wherein at least one of the first perforated surface and the second perforated surface does not extend to a bottom surface of the slurry conduit.

C13. The apparatus of any of paragraphs C1-C12, wherein at least one of the first perforated surface and the second perforated surface is configured to prevent at least 90 wt % of the plurality of solid particles from passing therethrough, and optionally wherein at least one of the first perforated surface and the second perforated surface is configured to prevent at least 92 wt %, 94 wt %, 96 wt %, 98 wt %, 99 wt %, 99.5 wt %, or 99.9 wt % of the plurality of solid particles from passing therethrough.

C14. The apparatus of paragraph C13, wherein at least 50 wt % of any of the solid particles in the slurry that are less than 1 micron in diameter may pass through at least one of the first perforated surface and the second perforated surface.

D1. An apparatus for removing fluid from a slurry, the apparatus comprising:
 a body defining a slurry conduit, wherein the slurry conduit is in fluid communication with a first perforated region and a second perforated region;
 a slurry stream delivery system configured to provide a slurry stream including the slurry to the slurry conduit, wherein the slurry includes a liquid and a plurality of solid particles;
 a displacing fluid delivery system configured to inject a displacing fluid through the first perforated region and into the slurry conduit as a displacing fluid stream; and
 a displaced fluid receiving system configured to receive a displaced fluid stream from the slurry conduit through the second perforated region, wherein the displaced fluid stream includes at least a portion of the displacing fluid and at least a portion of the liquid from the slurry.

D2. The apparatus of paragraph D1, wherein the apparatus is configured to supply the slurry stream, inject the displacing fluid stream, and receive the displaced fluid stream simultaneously, and optionally wherein the apparatus is configured to supply the slurry stream, inject the displacing fluid stream, and receive the displaced fluid stream continuously.

D3. The apparatus of any of paragraphs D1-D2, wherein the apparatus further includes a product slurry receiving system configured to receive a product slurry stream from the slurry conduit, wherein the product slurry stream includes at least a portion of the displacing fluid and at least a portion of the plurality of solid particles, and optionally wherein the product slurry stream includes a lower concentration of the liquid than the slurry stream.

D4. The apparatus of paragraph D3, wherein the apparatus further includes an evaporator configured to evaporate at least a portion of the displacing fluid from the product slurry stream to produce a dried slurry stream, and optionally wherein the evaporator is configured to evaporate all of the displacing fluid from the product slurry stream.

D5. The apparatus of any of paragraphs D1-D4, wherein the apparatus further includes a separation assembly configured to separate the displaced fluid stream into a liquid stream and a recycle stream, wherein the liquid stream includes a lower concentration of the displacing fluid than the displaced fluid stream, and further wherein the recycle stream includes a higher concentration of the displacing fluid than the displaced fluid stream, and optionally wherein the separation assembly includes at least one of a distillation system, a throttle valve, and a liquid-vapor separation assembly.

D6. The apparatus of paragraph D5, wherein the apparatus further includes a recycle system configured to supply at least a portion of the recycle stream to the displacing fluid delivery system for injection into the slurry conduit.

D7. The apparatus of any of paragraphs D1-D6, wherein the slurry stream delivery system includes a mixing assembly configured to receive a feedstock solids stream and a feedstock liquid stream and to produce the slurry stream.

D8. The apparatus of paragraph D7, wherein the mixing assembly includes an agitator configured to mix the feedstock solids stream and the feedstock liquid stream.

D9. The apparatus of paragraph D8, wherein the agitator includes a pipe, and further wherein the pipe is at least 100 meters in length, and optionally wherein the pipe is at least 150 meters, at least 200 meters, at least 250 meters, at least 300 meters, at least 350 meters, at least 400 meters, at least 450 meters, or at least 500 meters in length.

D10. The apparatus of any of paragraphs D8-D9, wherein the agitator includes a static mixer, and optionally wherein the static mixer is contained within the pipe.

D11. The apparatus of any of paragraphs D1-D10, wherein the first perforated region includes a plurality of first perforations, and further wherein the displacing fluid delivery system is configured to inject the displacing fluid through at least a portion of the plurality of first perforations.

D12. The apparatus of any of paragraphs D1-D11, wherein the first perforated region includes a first porous region that includes a plurality of first region pores, and further wherein the displacing fluid delivery system is configured to inject the displacing fluid through at least a portion of the plurality of first region pores.

D13. The apparatus of any of paragraphs D1-D12, wherein the second perforated region includes a plurality of second perforations, and further wherein the displaced fluid receiving system is configured to receive the displaced fluid stream through at least a portion of the plurality of second perforations.

D14. The apparatus of any of paragraphs D1-D13, wherein the second perforated region includes a second porous region that includes a plurality of second region pores, and further wherein the displaced fluid receiving system is configured to receive the displaced fluid stream through at least a portion of the plurality of second region pores.

D15. The apparatus of any of paragraphs D1-D14, wherein at least one of the first perforated region and the second perforated region includes at least one of a wire mesh, a metal screen, a sintered metal, a porous ceramic, and cemented rock.

D16. The apparatus of any of paragraphs D1-D15, wherein at least one of the first perforated region and the second perforated region includes a removable portion configured to be removed from the apparatus.

D17. The apparatus of any of paragraphs D1-D16, wherein the first perforated region is generally opposed to the second perforated region.

D18. The apparatus of any of paragraphs D1-D17, wherein the first perforated region is spaced apart from the second perforated region in a direction that is generally parallel to a slurry stream flow direction, and optionally in a direction that is generally perpendicular to the slurry stream flow direction.

D19. The apparatus of any of paragraphs D1-D18, wherein the first perforated region and the second perforated region form a portion of an annular space, and optionally wherein the slurry stream delivery system is configured to supply the slurry stream to the annular space.

D20. The apparatus of any of paragraphs D1-D18, wherein the body defines at least a portion of an annular space, and optionally wherein the slurry stream delivery system is configured to supply the slurry stream to the annular space.

D21. The apparatus of any of paragraphs D19-D20, wherein the apparatus further includes an outer housing that surrounds at least a portion of the body, optionally wherein the outer housing, and the body form a pipe-in-pipe arrangement.

D22. The apparatus of paragraph D21, wherein the body is a first body that includes the first perforated region, wherein the apparatus further includes a second body that includes the second perforated region, and further wherein, the outer housing, the first body, and the second body form a pipe-in-pipe-in-pipe arrangement.

D23. The apparatus of any of paragraphs D1-D22, wherein the body includes a fluid impervious region.

D24. The apparatus of paragraph D23, wherein the fluid impervious region forms at least a portion of a bottom surface of the body.

D25. The apparatus of any of paragraphs D23-D24, wherein the fluid impervious region is configured to be selectively removed from the apparatus, and optionally wherein the fluid impervious region is configured to be replaced.

D26. The apparatus of any of paragraphs D23-D25, wherein the fluid impervious region is configured to form a wear-resistant surface.

D27. The apparatus of any of paragraphs D23-D26, wherein the fluid impervious region is continuous in a direction that is generally parallel to a slurry stream flow direction.

D28. The apparatus of any of paragraphs D23-D27, wherein the fluid impervious region is discontinuous in a direction that is generally parallel to a slurry stream flow direction.

D29. The apparatus of any of paragraphs D1-D28, wherein at least one of the first perforated region and the second perforated region is in fluid communication with a flow port, and optionally wherein at least one of the first perforated region and the second perforated region is in fluid communication with a plurality of flow ports, and further optionally wherein both the first perforated region and the second perforated region are in fluid communication with a plurality of flow ports.

D30. The apparatus of any of paragraphs D1-D29, wherein the displacing fluid delivery system is configured to periodically inject the displacing fluid through the second perforated region and into the slurry stream as the displacing fluid stream, and further wherein the displaced fluid receiving system is configured to periodically receive the displaced fluid stream from the first perforated region.

D31. The apparatus of any of paragraphs D1-D30, wherein the slurry includes sand, bitumen, and a hydrocarbon solvent, and optionally wherein the hydrocarbon solvent includes a molecular weight of less than 200 grams/mole, optionally including a molecular weight of less than 190 grams/mole, less than 180 grams/mole, less than 171 grams/mole, less than 170 grams/mole, less than 160 grams/mole, or less than 150 grams/mole.

D32. The apparatus of paragraph D31, wherein at least a portion of the bitumen is dissolved within the hydrocarbon solvent, and further wherein the liquid includes the portion of the bitumen and the hydrocarbon solvent.

D33. The apparatus of any of paragraphs D1-D32, wherein the slurry includes water and mine tailing fines from a mining operation.

D34. The apparatus of any of paragraphs D1-D33, wherein the liquid includes at least one of water and brine, and optionally wherein the liquid is at least one of water and brine.

D35. The apparatus of any of paragraphs D1-D34, wherein the displacing fluid includes at least 25 wt % hydrocarbons, optionally including at least 30 wt %, at least 40 wt %, at least 50 wt %, at least 60 wt %, at least 75 wt %, or at least 75 wt % hydrocarbons, and further optionally wherein the hydrocarbons include an average molecular weight less than or equal to 250 grams/mole, optionally including an average molecular weight of less than or equal to 225 grams/mole, less than or equal to 200 grams/mole, less than or equal to 175 grams/mole, less than or equal to 150 grams/mole, less than or equal to 125 grams/mole, less than or equal to 100 grams/mole, less than or equal to 90 grams/mole, less than or equal to 80 grams/mole, less than or equal to 70 grams/mole, less than or equal to 60 grams/mole, less than or equal to 50 grams/mole, less than or equal to 40 grams/mole, or less than or equal to 30 grams/mole.

D36. The apparatus of any of paragraphs D1-D35, wherein the displacing fluid includes at least 25 wt % carbon dioxide, optionally including at least 30 wt %, at least 35 wt %, at least 40 wt %, at least 45 wt %, at least 50 wt %, at least 55 wt %, at least 60 wt %, at least 65 wt %, at least 70 wt %, or at least 75 wt % carbon dioxide.

D37. The apparatus of any of paragraphs D1-D36, wherein the displacing fluid includes at least one of a gas phase fluid, a vapor phase fluid, a liquid phase fluid, a supercritical fluid, and a dense supercritical fluid, and optionally wherein the displacing fluid is at least one of a gas phase fluid, a vapor phase fluid, a liquid phase fluid, a supercritical fluid, and a dense supercritical fluid.

D38. The apparatus of any of paragraphs D1-D37, wherein at least one of the first perforated region and the second perforated region is sized to prevent at least 90 wt % of the plurality of solid particles from passing therethrough, and optionally wherein at least one of the first perforated region and the second perforated region is sized to prevent at least 92 wt %, 94 wt %, 96 wt %, 98 wt %, 99 wt %, 99.5 wt %, or 99.9 wt % of the plurality of solid particles from passing therethrough.

D39. The apparatus of paragraph D38, wherein at least one of the first perforated region and the second perforated region is sized to permit at least 30 wt % of a portion of the solid particles that are less than 1 micron in diameter to pass therethrough, and optionally wherein at least one of the first perforated region and the second perforated region is sized to permit at least 40 wt %, at least 50 wt %, at least 60 wt %, or at least 70 wt % of the portion of the solid particles that are less than 1 micron in diameter to pass therethrough.

D40. The apparatus of any of paragraphs D1-D39, wherein each of the plurality of solid particles includes a characteristic dimension, and further wherein at least 30 wt % of the solid particles with a characteristic dimension of less than 44 microns also have a characteristic dimension of less than 10 microns, and optionally wherein at least 40 wt %, at least 50 wt %, at least 60 wt %, or at least 70 wt % of the solid particles with a characteristic dimension of less than 44 microns also have a characteristic dimension of less than 10 microns.

D41. The apparatus of any of paragraphs D1-D40, wherein the slurry stream delivery system is configured to deliver the slurry stream at a delivery flow rate, and further wherein, at the delivery flow rate, the slurry stream includes at least one of a laminar flow profile and a turbulent flow profile when in fluid communication with the slurry conduit.

E1. The use of the methods of any of paragraphs A1-B42 with any of the apparatus of any of paragraphs C1-D40.

E2. The use of any of the apparatus of any of paragraphs C1-D40 with any of the methods of any of paragraphs A1-B42.

E3. The use of any of the methods of any of paragraphs A1-B42 and/or any of the apparatus of any of paragraphs C1-D40 to produce hydrocarbons.

E4. The use of any of the methods of any of paragraphs A1-B43 and/or any of the apparatus of any of paragraphs C1-D40 to dewater mine tailings.

E5. Dewatered mine tailings produced by the use of paragraph E4.

E6. The use of any of the methods of any of paragraphs A1-B42 and/or any of the apparatus of any of paragraphs C1-D40 to separate the components of a two-phase mixture.

E7. The use of any of the methods of any of paragraphs A1-B42 and/or any of the apparatus of any of paragraphs C1-D40 as part of an oil production operation.

E8. Oil produced by the use of paragraph E7.

INDUSTRIAL APPLICABILITY

The systems and methods disclosed herein are applicable to the oil and gas industry.

It is believed that the disclosure set forth above encompasses multiple distinct inventions with independent utility. While each of these inventions has been disclosed in its preferred form, the specific embodiments thereof as disclosed and illustrated herein are not to be considered in a limiting sense as numerous variations are possible. The subject matter of the inventions includes all novel and non-obvious combinations and subcombinations of the various elements, features, functions and/or properties disclosed herein. Similarly, where the claims recite "a" or "a first" element or the equivalent thereof, such claims should be understood to include incorporation of one or more such elements, neither requiring nor excluding two or more such elements.

It is believed that the following claims particularly point out certain combinations and subcombinations that are directed to one of the disclosed inventions and are novel and non-obvious. Inventions embodied in other combinations and subcombinations of features, functions, elements and/or properties may be claimed through amendment of the present claims or presentation of new claims in this or a related application. Such amended or new claims, whether they are directed to a different invention or directed to the same invention, whether different, broader, narrower, or equal in scope to the original claims, are also regarded as included within the subject matter of the inventions of the present disclosure.

The invention claimed is:

1. A method for separating components of a slurry, the method comprising:

flowing a slurry stream that includes the slurry through a slurry conduit defined by a body, wherein the slurry conduit is in fluid communication with a first perforated region and a second perforated region, and further wherein the slurry includes a liquid and a plurality of solid particles;

injecting a displacing fluid through the first perforated region and into the slurry conduit as a displacing fluid stream;

displacing at least a portion of the liquid from the slurry with the displacing fluid stream to create a product slurry stream that includes at least a portion of the injected displacing fluid and at least a portion of the plurality of solid particles; and producing a displaced fluid stream from the slurry conduit through the second perforated region, wherein the displaced fluid stream includes at least a portion of the displacing fluid and at least a portion of the liquid from the slurry;

wherein at least one of the first perforated region and the second perforated region includes one of (i) at least one of a wire mesh, a metal screen, a sintered metal, a porous ceramic, and cemented rock and (ii) is in fluid communication with a flow port.

2. The method of claim 1, wherein the method further includes one of (i) evaporating at least a portion of the displacing fluid from the product slurry stream to produce a dried slurry stream, (ii) at least one of maintaining a pressure of the displacing fluid stream to be higher than a pressure of the slurry stream, maintaining the pressure of the slurry stream to be higher than a pressure of the displaced fluid stream, and maintaining the pressure of the displacing fluid stream to be higher than the pressure of the displaced fluid stream, (iii) separating the displaced fluid stream into a liquid stream and a recycle stream, wherein the liquid stream includes a lower concentration of the displacing fluid than the displaced fluid stream, and further wherein the method further includes injecting at least a portion of the recycle stream as at least a portion of the displacing fluid stream, and (iv) reversing the injecting and the producing, wherein the reversing includes injecting the displacing fluid stream through the second perforated region and producing the displaced fluid stream through the first perforated region.

3. The method of claim 1, wherein the body defines at least a portion of an annular space, and wherein the flowing includes flowing the slurry stream within the annular space.

4. The method of claim 1, wherein the slurry includes one of (i) sand, bitumen, and a hydrocarbon solvent and (ii) water and mine tailing fines from a mining operation.

5. The method of claim 1, wherein the liquid includes at least one of water and brine.

6. The method of claim 1, wherein the displacing fluid includes at least one of (1) at least 25 wt % hydrocarbons, and (2) at least 25 wt % carbon dioxide.

* * * * *